US012519655B2

(12) United States Patent
Sun et al.

(10) Patent No.: US 12,519,655 B2
(45) Date of Patent: Jan. 6, 2026

(54) RADIO ACCESS NETWORK NODE AUTHENTICATION USING RADIO RESOURCE CONTROL SIGNAL MESSAGES

(71) Applicant: Dell Products, L.P., Round Rock, TX (US)

(72) Inventors: Sheng Sun, Kanata (CA); Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 259 days.

(21) Appl. No.: 18/328,352

(22) Filed: Jun. 2, 2023

(65) Prior Publication Data

US 2024/0406004 A1 Dec. 5, 2024

(51) Int. Cl.
*H04L 9/40* (2022.01)
*H04L 9/32* (2006.01)
*H04W 76/10* (2018.01)

(52) U.S. Cl.
CPC ........... *H04L 9/3247* (2013.01); *H04W 76/10* (2018.02)

(58) Field of Classification Search
CPC ............................ H04L 9/3247; H04W 76/10
See application file for complete search history.

(56) References Cited

U.S. PATENT DOCUMENTS 10,630,682 B1 * 4/2020 Bhattacharyya .... H04L 63/0869
11,882,449 B1 * 1/2024 Wan ........................ H04W 4/06
12,113,912 B2 * 10/2024 Jang ...................... H04L 9/3263
12,160,518 B2 * 12/2024 Lee ....................... H04W 48/12
2005/0120246 A1 * 6/2005 Jang ........................ H04L 9/083 726/4
2011/0019604 A1 * 1/2011 Chun ................. H04W 72/535 370/312
2016/0094542 A1 * 3/2016 Lee .................... H04W 12/062 726/7

(Continued)

OTHER PUBLICATIONS

International Search Report and Written Opinion for PCT Application No. PCT/US2023/036186 mailed Feb. 20, 2024, 15 pages.

(Continued)

*Primary Examiner* — Ghodrat Jamshidi
(74) *Attorney, Agent, or Firm* — Amin, Turocy & Watson, LLP

(57) ABSTRACT

A radio access network node and a user equipment may be configured with a private key and a complementary public key, respectively, to be used to determine whether radio resource control signal connection establishment messages received at the user equipment are received from a legitimate node or from a false base station. The user equipment may request from a node that broadcast a connection establishment message an on demand digital signature based on the connection establishment message. In response to the request, the node may transmit, via an on demand system information message, an on demand digital signature generated based on the connection establishment message and the private key. The user equipment may determine a local digital signature based on the connection establishment message and the public key. The user equipment may perform a connection establishment action based on whether the local digital signature matches the on demand digital signature.

20 Claims, 20 Drawing Sheets

(56) References Cited

U.S. PATENT DOCUMENTS

| | | | | |
|---|---|---|---|---|
| 2020/0145821 | A1* | 5/2020 | Lee | H04W 48/12 |
| 2021/0212121 | A1* | 7/2021 | Niu | H04W 24/10 |
| 2022/0264307 | A1* | 8/2022 | Sasi | H04L 63/1458 |
| 2024/0196309 | A1* | 6/2024 | Yapici | H04W 48/08 |
| 2024/0389083 | A1* | 11/2024 | Damnjanovic | H04W 72/0453 |
| 2025/0016750 | A1* | 1/2025 | Shi | H04W 56/001 |

OTHER PUBLICATIONS

Chen et al. "Recommendations for Discrete Logarithm-based Cryptography: Elliptic Curve Domain Parameters" NIST SP 800-186, Feb. 2023, 75 pages.

U.S. Department of Commerce. "Digital Signature Standard (DSS)" NIST FIPS 186-2, Jan. 2000, 72 pages.

"Ed25519: high-speed high-security signatures" [https://ed25519.cr.yp.to/] retrieved May 31, 2024, 2 pages.

"3rd Generation Partnership Project; Technical Specification Group Services and System Aspects Study on 5G Security Enhancement against False Base Stations (FBS) (Release 18)", 3GPP Standard; Technical Report; 3GPP TR 33.809, V0.20.0, Oct. 24, 2022, [https://ftp.3gpp.org/Specs/archive/33_ series/33.809/33809-0k0.zip 33809-0t0.docx] 131 pages.

"3rd Generation Partnership Project; Technical Specification Group Radio Access Network; NR; Radio Resource Control (RRC) protocol specification (Release 17)", 3GPP Standard; Technical Specification; 3GPP TS 38.331, No. V17.4.0, Mar. 30, 2023, [https://ftp.3gpp.org/Specs/archive/38_ series/38.331/38331-h40.zip 38331-h40. docx], 1324 pages.

"3rd Generation Partnership Project; Technical Specification Group Services and System Aspects; Study on the security aspects of the next generation system (Release 14)", 3GPP Standard; Technical Report; 3GPP TR 33.899, VI.3.0, Aug. 21, 2017, 605 pages.

* cited by examiner 100
110
115
135
125
105
120
117
137
CORE NETWORK 130
INTERNET SERVICES 150
140
145

405

455

900

1000

RADIO ACCESS NETWORK NODE AUTHENTICATION USING RADIO RESOURCE CONTROL SIGNAL MESSAGES

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

Nefarious actors may deploy wireless devices that pose as base stations that are part of a legitimate mobile network operator's network (e.g., a Public Land mobile Network ("PLMN")), but in fact are not legitimate parts of a mobile network operator's network. The illegitimate devices may seek to attract a user equipment to attempt to connect to the devices to obtain personal information of a user of the user equipment attempting to connect to the illegitimate devices, or to obtain information corresponding to a mobile network operator, such as security credentials. An illegitimate device posing as a legitimate base station (e.g.; posing as a legitimate RAN) may be referred to as a fake base station, a false base station, or fake RAN. Other terminology that may refer to a fake base station may include 'an IMSI-catcher,' a 'cellular phone surveillance device,' 'rogue base station,' or 'cell site simulator.'

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio access network node comprising a processor, transmitting, to a user equipment, a connection establishment message comprising an on demand digital signature capability indication. Responsive to the transmitting of the connection establishment message, the method may comprise facilitating, by the radio access network node, receiving, from the user equipment, an on demand digital signature request comprising on demand digital signature information. The method may further comprise generating, by the radio access network node, an on demand digital signature based on the on demand digital signature information. The method may further comprise facilitating, by the radio access network node, transmitting, to the user equipment, the on demand digital signature, and responsive to the transmitting of the on demand digital signature, facilitating, by the radio access network node, establishing, with the user equipment, a communication session.

The on demand digital signature information may comprise a random number generated by the user equipment and may be based on a unique identifier corresponding to the user equipment. The connection establishment message may be a radio resource control message. The connection establishment message may be a master information block message. The on demand digital signature information may comprise an indication, such as a bit in a bitmap, indicative that the on demand digital signature is to be based on at least the master information block message. The connection establishment message may be a system information block message. The on demand digital signature information may comprise an indication, such as a bit in a bitmap, indicative that the on demand digital signature is to be based on at least the system information block message. The system information block message may be a system information block 1 message (e.g., an SIB1 message).

In an embodiment, the method may further comprise generating, by the radio access network node, a connection establishment message digest based on the connection establishment message and encrypting, by the radio access network node using a unique cryptographic key, such a private key, corresponding to the radio access network node, the connection establishment message digest to result in the on demand digital signature. The digest and the applying of the private key may be performed by a digital signature module at the radio access network node.

In an embodiment, the transmitting of the on demand digital signature may comprise transmitting the on demand digital signature to the user equipment in a system information block message, which may be an on demand system information message.

In another embodiment, a radio access network node may comprise a processor configured to broadcast a minimum requirement message comprising an on demand digital signature capability indication, generate an on demand digital signature based on the minimum requirement message, and transmit, to a user equipment, the on demand digital signature. Responsive to the on demand digital signature being transmitted to the user equipment, the processor may be configured to receive, from the user equipment, a connection establishment request message. Responsive to the connection establishment request message being received, the process may be configured to establish, with the user equipment, a communication session. The minimum requirement message may comprise at least one of: a master information block or a system information block.

The processor may be further configured to, responsive to the minimum requirement message being broadcast, receive, from the user equipment, an on demand digital signature request comprising on demand digital signature information that comprises a message block indication indicative of a message block to be used to generate the on demand digital signature. The on demand digital signature information may comprise a message block indication that indicates that the on demand digital signature is to be based on at least one of the master information block or the system information block.

In an embodiment, the system information block may be a first system information block, and the on demand digital signature information may comprises a message block indication that indicates that the on demand digital signature is to be based on one or more of the master information block, the first system information block, or a second information block that is different from the first system information block. In an embodiment, the message block indication may comprise a bitmap that excludes one or more bits being mapped to the master information block and the first system information block, which may be indicative that the master information block and the first system information block are to be used as a basis for the on demand digital signature. In an embodiment, exclusion of one or more bits being mapped to the master information block and the first system information block may be indicative that the master information block and the first system information block are not to be used as a basis for the on demand digital signature.

In another example embodiment, a non-transitory machine-readable medium may comprises executable instructions that, when executed by a processor of a radio access network node, facilitate performance of operations, comprising: broadcasting a first radio resource control message comprising an on demand digital signature capability indication indicative of an on demand digital signature capability and responsive to the broadcasting of the first radio resource control message, receiving, from a user equipment, an on demand digital signature request message. The operations may further comprise responsive to the on demand digital signature request message, generating an on demand digital signature according to the on demand digital signature capability and transmitting, to the user equipment, the on demand digital signature. The operations may further comprise receiving, from the user equipment, a second radio resource control message comprising a connection request message and responsive to second radio resource control message, establishing, with the user equipment, a communication session.

In an embodiment, the on demand digital signature request message may comprise a bit map indicative of on demand digital signature information to be used to generate the on demand digital signature.

In an embodiment, the first radio resource control message may comprise at least one of a master information block or a system information block, and the on demand digital signature request message may comprise a bit map indicative of at least one of the master information block or the system information block.

In an embodiment, the first radio resource control message may comprise a system information block 1 message.

Another example embodiment method may comprise facilitating, by a user equipment comprising a processor, receiving, from a radio access network node, a connection establishment message comprising an on demand digital signature capability indication indicative of an on demand digital signature capability and facilitating, by the user equipment, receiving, from the radio access network node, an on demand digital signature corresponding to the on demand digital signature capability. The method may further comprise generating, by the user equipment, a local digital signature based on the on demand digital signature information; analyzing, by the user equipment, the on demand digital signature with respect to the local digital signature to result in an authentication result; and based on the authentication result, performing, by the user equipment, a connection establishment action.

In an embodiment, the method may further comprise responsive to the on demand digital signature capability indication, facilitating, by the user equipment, transmitting, to the radio access network node, an on demand digital signature request comprising an on demand digital signature information indication indicative of on demand digital signature information on which the on demand digital signature is to be based. The on demand digital signature information may comprise an indication of one or more of an MIB message, an SIB message, or a random number/value.

In an embodiment, if the authentication result is a mismatch indication indicative of the local digital signature being different than the on demand digital signature, the connection establishment action may comprise avoiding establishing a connection with the radio access network node.

In an embodiment, performing the connection establishment action may comprise updating a barred radio access network node list (e.g., a barred RAN list) to indicate that the node, via, for example, an identifier corresponding to the radio access network node, is an illegitimate radio access network node, or a false base station, with which the user equipment is not configured to communication.

In an embodiment, the radio access network node may a first radio access network node, the connection establishment message may be a first connection establishment message, the on demand digital signature request may be a first on demand digital signature request, the on demand digital signature information may be a first on demand digital signature information, the on demand digital signature may be a first on demand digital signature, the local digital signature may be a first local digital signature, the authentication result may be a first authentication result, and the connection establishment action may be a first connection establishment action. In the embodiment, the method may further comprise facilitating, by the user equipment, receiving, from a second radio access network node, a second connection establishment message comprising the on demand digital signature capability indication; determining, by the user equipment, a first signal strength corresponding to the first radio access network node; and determining, by the user equipment, a second signal strength corresponding to the second radio access network node. The user equipment may transmit the first on demand digital signature request to the first radio access network node based on the first signal strength being higher than the second signal strength. Responsive to the second connection establishment message, the method may comprise facilitating, by the user equipment, transmitting, to the second radio access network node, a second on demand digital signature request comprising second on demand digital signature information and facilitating, by the user equipment, receiving, from the second radio access network node, a second on demand digital signature based on the second on demand digital signature information. The method may further comprise generating, by the user equipment, a second local digital signature based on the second on demand digital signature information; analyzing, by the user equipment, the second on demand digital signature with respect to the second local digital signature to result in a second authentication result; and based on the second authentication result, performing, by the user equipment, a second connection establishment action.

The performing the first connection establishment action may comprise updating a barred radio access network node list to result in an updated barred radio access network node list to indicate that a node identifier corresponding to the radio access network node corresponds to an illegitimate radio access network node. The method may further comprise facilitating, by the user equipment, transmitting, to the second radio access network node, the updated barred radio access network node list.

In an embodiment, the authentication result may comprise a match indication indicative of the local digital signature being the same as the on demand digital signature, and the connection establishment action may comprise facilitating, by the user equipment, transmitting, to the radio access network node, a connection establishment request message to establish a connection between the user equipment and the radio access network node.

In an embodiment, the method may further comprise: based on a unique identifier corresponding to the user equipment, generating, by the user equipment, a random value. The on demand digital signature information may comprise the random value and a message block indication indicative that the on demand digital signature is to be based on at least the random value and an information block corresponding to the message block indication.

In an embodiment, the connection establishment message may be a radio resource control message. In an embodiment, the connection establishment message may be a master information block message. In an embodiment, the connection establishment message may be a system information block message.

In an embodiment, the on demand digital signature information may comprise a message block indication indicative that the on demand digital signature is to be based on at least the connection establishment message.

In another example embodiment, a user equipment may comprise a processor configured to receive, from a radio access network node, a connection establishment message comprising an on demand digital signature capability indication; and responsive to the connection establishment message, transmit, to the radio access network node, an on demand digital signature request comprising on demand digital signature information. The processor may be further configured to receive, from the radio access network node, an on demand digital signature; generate a local digital signature based on the on demand digital signature information; analyze the on demand digital signature with respect to the local digital signature to result in an authentication result; and based on the authentication result, perform, by the user equipment, a connection establishment action.

In an embodiment, the authentication result may comprise a mismatch indication indicative of the local digital signature being different than the on demand digital signature, and the connection establishment action may comprise avoiding establishing a connection with the radio access network node. The connection establishment action may comprise updating a barred radio access network node list to result in an updated barred radio access network node list that indicates a node identifier corresponding to the radio access network node corresponds to an illegitimate radio access network node, or a false base station. The radio access network node may be a first radio access network node, and the processor may be further configured to: establish, with a second radio access network node, a communication session; and transmit, to the second radio access network node, the updated barred radio access network node list if the user equipment determines that the second radio access network node is a legitimate radio access network node.

In yet another example embodiment, a non-transitory machine-readable medium, may comprise executable instructions that, when executed by a user equipment, facilitate performance of operations, comprising: receiving, from a radio access network node, a connection establishment message comprising a first information block that comprises an on demand digital signature capability indication indicative of an on demand digital signature capability and a radio access network node identifier corresponding to the radio access network node. The operations may further comprise receiving, from the radio access network node, a second information block and receiving, from the radio access network node, an on demand digital signature according to the on demand digital signature capability. The operations may further comprise generating a local digital signature based on at least one of the first information block or the second information block. The operations may further comprise analyzing, by the user equipment, the on demand digital signature with respect to the local digital signature to result in an authentication result; and based on the authentication result, performing, by the user equipment, a connection establishment action. The operations may further comprise decrypting the on demand digital signature according to a unique cryptographic key corresponding to the radio access network node identifier to result in the decrypted on demand digital signature.

In an embodiment, the connection establishment message may further comprise a radio access node identifier that corresponds to the radio access network node and the operations may further comprise: based on the on demand digital signature capability indication, transmitting, according to the radio access node identifier, an on demand digital signature request comprising an on demand digital signature information indication indicative of on demand digital signature information on which the on demand digital signature is to be based.

In an embodiment, the on demand digital signature information on which the on demand digital signature is to be based may comprise at least one of the first information block or the second information block.

In an embodiment, the on demand digital signature is received via a system information block message.

DETAILED DESCRIPTION OF THE DRAWINGS

Figure 1:
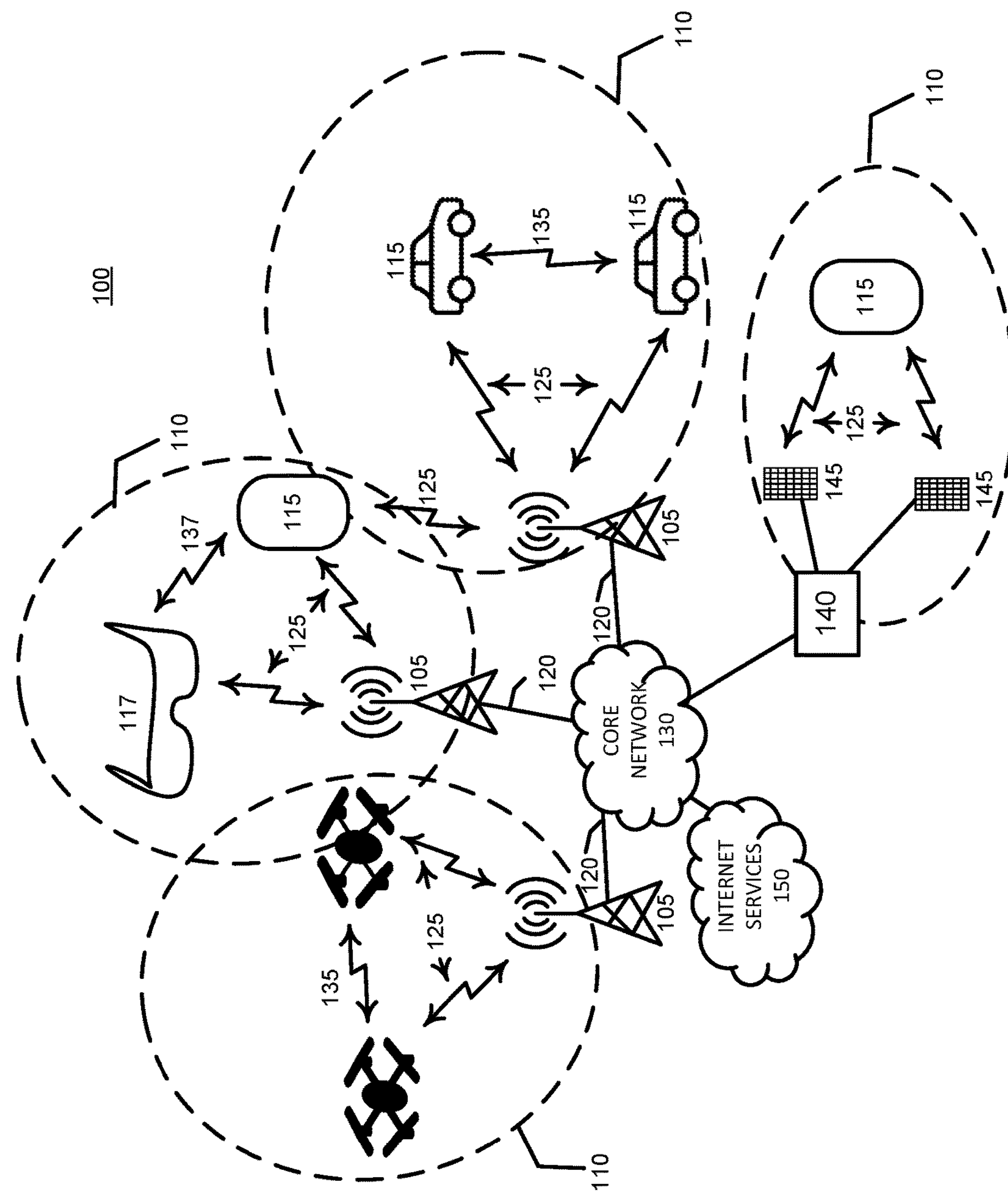
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. An artificial intelligence machine learning models ("AI/ML model") functionality can be implemented and structured in many different forms and with varying vendor-proprietary designs. A 5G radio access network node ("RAN") of a network to which the user equipment may be attached or with which the user equipment may be registered may manage or control real-time AI/ML model performance at different user equipment devices for various radio functions.

A network RAN can dynamically control activation, deactivation, triggering of model retraining (that may be radio-function-specific) or updating of a learning model depending on monitoring and analysis of defined real-time performance metrics corresponding to a learning model being executed at a user equipment. It will be appreciated that even though a learning model may be implementing a particular radio function, metrics that are monitored or analyzed may be learning model metrics, not necessarily radio function metrics (e.g., a mathematical/statistical metric not necessarily a radio function metric such as, for example, signal strength).

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 17.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or more component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples. M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA). LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMD) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRCD), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

It is desirable to protect against attacks by False Base Station ("FBS"). 5G NR Radio Resource Control ("RRC") Signaling typically comprises a master information block ("MIB") message and System Information Block ("SIB") messages that may be used to facilitate, or that may be vulnerable to, FBS attacks. Multiple types, or versions of SIB messages may be transmitted by a RAN during an RRC procedure with a UE that is attempting to establish a connection with the RAN. Different SIB types may be referred to by different numerical identifiers, for example, an SIB1 message, an SIB2 message, an SIB3 message, and so on. An MIB message or an SIB1 message may be referred to as, or may comprise what is referred to as, minimum system information. Other SIB messages may be used to transmit system information during RRC connection establishment.

Figure 2:
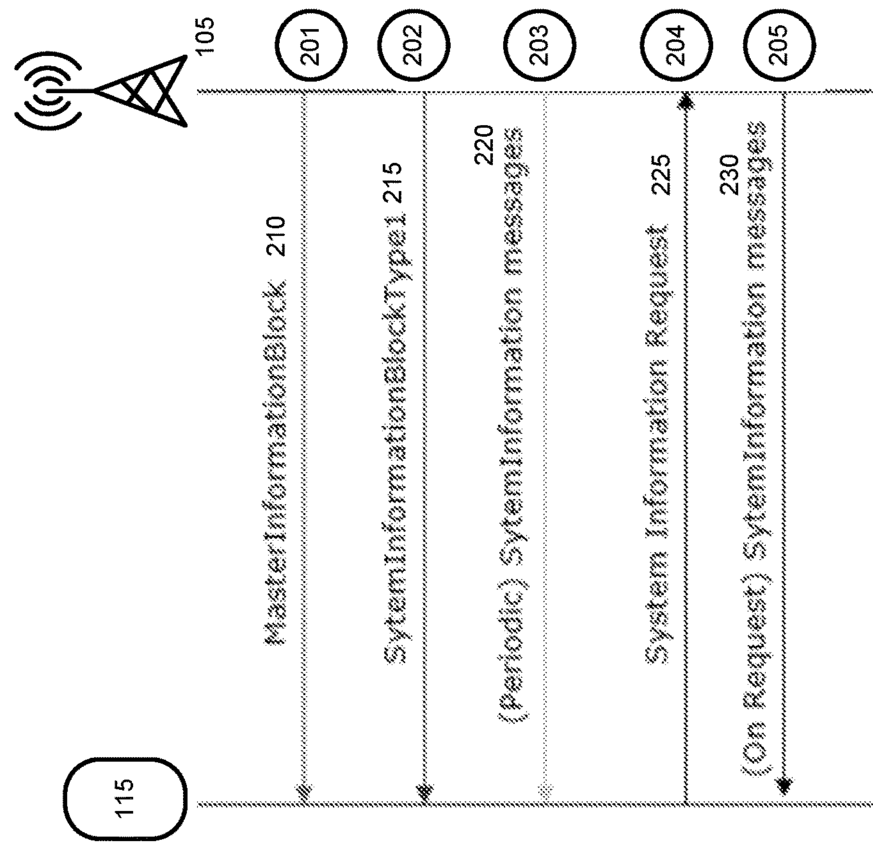
FIG. 2 illustrates a timing diagram of connection establishment signaling message.

An MIB may carry, or comprise, channel bandwidth information, PHICH configuration information; transmit power information, number of antenna information, and SIB scheduling information transmitted. An SIB may be transmitted via a downlink shared channel. A system information container ("SI") may comprise multiple SIBs. Different SI containers may be transmitted at different frequencies and with sub-frames. SIB messages may be transmitted via a broadcast control channel ("BCCH"). As shown in FIG. 2, with 5G NR there are two different methods of transmitting SIBs. After an MIB 210 is transmitted by RAN 105 at act 210, one type of SIB, such as SIB1 215 transmitted at act 202 and other SIBs 220 that may be transmitted at act(s) 203, may be transmitted periodically. An SIB1 message may be transmitted at a configured periodicity of 160 milliseconds (ms). SIB1 message 215 may comprise information corresponding to, or indicative of, periodicity of other periodically transmitted SIB messages. Another type of SIB, such as SIB 230, may be transmitted at act 205 in response to an SIB request message 225 transmitted by, and received from, UE 115 at act 204. MIB 210 and SIB1 215 may be transmitted as messages that comprise bit spaces that may be unused. SIB1 message 215 may comprise information corresponding to resources usable to transmit an SIB request message 225.

5G RRC access procedures comprise periodic broadcasts of MIB messages and SIB messages of types 1-21. With 5G NR implementations, other SIBs can be requested by UE. A general, overall, MIB/SIB acquisition may comprise: UE powering on or exiting an IDLE mode; a UE searching for signals from a RAN and decode an MIB broadcast by the RAN; the UE receiving, storing, and decoding the MIB; the UE checking a Cell barred list, or a RAN barred list, to determine whether the RAN that transmitted the MIB is barred (e.g., the RAN has been determined to be a FBS). If the user equipment determines, based on analysis of an identifier in the MIB with respect to the RAN barred list, that the RAN that transmitted the MIB is barred, the UE may halt further receiving or decoding of signaling broadcast/transmitted by the RAN identified as being a barred RAN. If the RAN that transmitted the MIB is not listed on a barred RAN list as being barred, the UE may receive an SIB1 message and attempt to decode the SIB1 message using information received in the MIB message. The UE may store the SIB1 message and may attempt decoding of more SIB messages that may be transmitted by the RAN that transmitted the MIB. The UE may transmit a system information request message to the RAN and may receive a responsive SIB message corresponding to the system information request message. Periodic SIB messages may be referred to as SIBs of types 1-21. Responsive SIB messages that are transmitted by a RAN in response to a system information request message may be referred to as SIBs of type 22 or higher.

Figure 3:
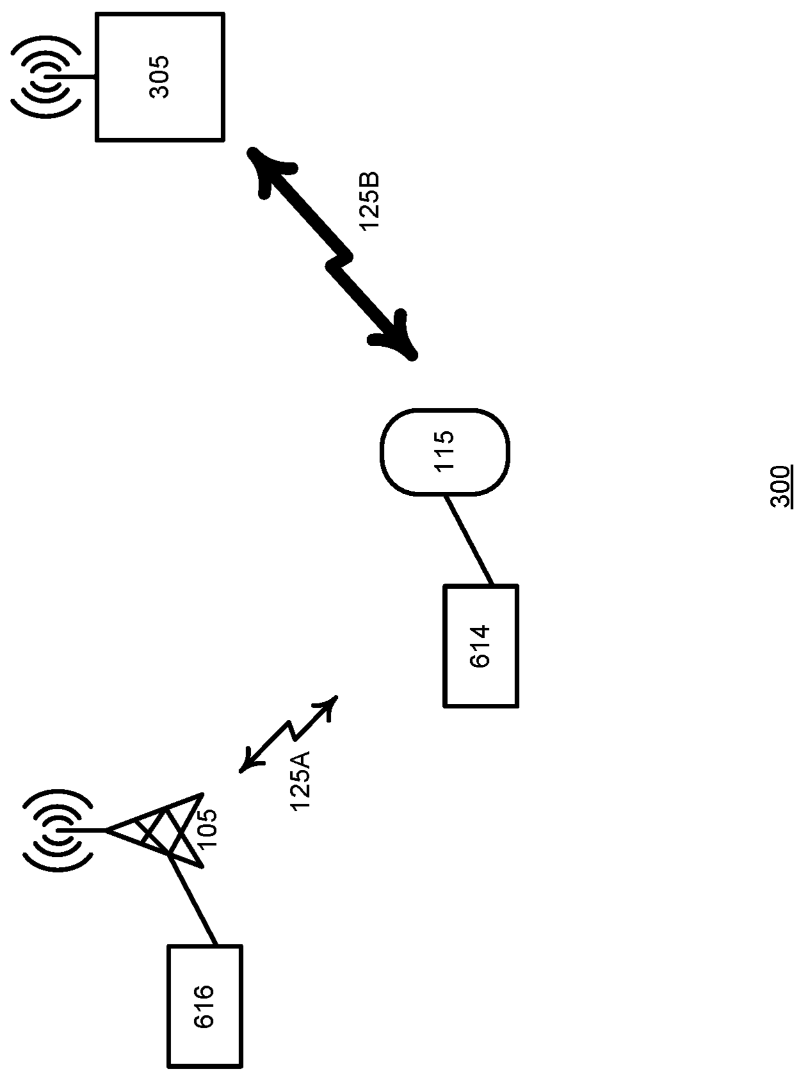
FIG. 3 illustrates an example environment with a false base station/fake radio access network node and with a legitimate radio access network node.

As shown in FIG. 3, false, or fake, base station 305 may transmit signals comprising messages that mimic; 'impersonate', emulate, spoof, simulate, identify as, conform to a format that is the same as, or otherwise seek to imitate an MIB or an SIB transmitted by a legitimate RAN 105. A legitimate RAN may be a radio access network node that corresponds to, or that is part of, a mobile network that user equipment 115 is configured to be a part of, connect to, or otherwise operate with. As shown in FIG. 3, wireless communication link 125B is illustrated with a heavier weight than communication link 125A to indicate that fake base station 305 may transmit a signal stronger than a signal transmitted by legitimate base station/RAN 105. UE may be configured to seek connection with 305 based on signals imitating MIB and SIB signals of a legitimate RAN due to a signal strength corresponding to link 125B being received at UE 115 with a stronger signal strength than a signal strength corresponding to RAN 105A. To combat FBS attacks, conventional protection schemes may comprise using identity or Public Key Infrastructure ("PKI") that may impose heavy processing loading on a processor at a user equipment or at a radio access network node.

Embodiments disclosed herein may comprise using digital signatures generated based on an MIB or SIB, such as, for example, based on an MIB message 210, an SIB1 message 215, or an SIB message 220 shown in FIG. 2. The digital signatures may be generated using private/public keys that are generated and distributed for the purpose of implementing embodiments disclosed herein. For example, an on demand digital signature private key 616 may be generated by legitimate RAN 105, or a component of a core network corresponding to the legitimate RAN, and an on demand public key 614 corresponding to private key 616 may be generated and transmitted to UE 115 and stored thereby. Using a digital signature based on an MIB or SIB message transmitted by a legitimate RAN, or transmitted by a FBS imitating a legitimate RAN, may facilitate a user equipment using an MIB or SIB message that is broadcast by a legitimate RAN or an FBS to authenticate and establish connection to, or to reject connection to, the RAN or FBS, respectively, before completing a connection to the RAN or FBS. Using embodiments disclosed herein may impose less loading on a processor of a UE or a RAN than conventional techniques. Embodiments disclosed herein may use, for example, a digital signature generation module that implements, for example, a digital signature scheme, such as an Ed25519 signature scheme. Embodiments disclosed herein may facilitate protection techniques mechanisms that may defeat a replay attack, a recording attack, a forgery attack, or a DoS/DDoS attack from an FBS/illegitimate/rogue RAN.

An FBS imitating MIB/SIBs of a legitimate RAN during an RRC access procedure may attempt to "trap" a UE attempting to connect with the FBS into the Non Access Stratum ("NAS") and eventually may expose credential information corresponding to the UE to the FBS. Table 1 highlights some attack vectors that may be attempted by a FBS via unprotected MIB/SIB messages.

TABLE 1

| Type | Issues | Attacking Scenarios | Threats |
|---|---|---|---|
| Unprotected MIB/SIB | Security protection of system information | OTA attackers who broadcast rogue SI messages or replay | DoS attack on UE |
| Unprotected MIB/SIB | Protection against Man-in-the-Middle false gNB attacks | A MitM false gNB transports messages between the UE and the network. For example, it may transport security protected messages without any modification while dropping, altering and/or injecting unprotected messages, such as: the pre-authentication traffic MAC/RLC layer message headers lower layer control messages such as buffer status reports | MITM attacks |

in NIST SP 800-186 and NIST FIPS 186-2. Embodiments disclosed herein may facilitate collision resistance (e.g., collisions that may result from weak hashing functionality).

Authenticating RRC Messages with On Demand Digital Signatures ("ODDS")

Embodiments disclosed herein may facilitate a user equipment authenticating a gNB/RAN based on a digital signature generated based on RRC signaling message, such as an MIB message, an SIB1 message, or another SIB message. Using embodiments disclosed herein may facilitate a user equipment avoiding connecting to a FBS and being subject to a FBS attack, such as a FBS attack listed in Table 1. 5G RRC signaling messages, including MIB messages SIB messages of types 1-21, are non-protected during the radio access process (e.g., not encrypted or otherwise open and accessible to any UE that can decode the messages). Although maintaining conventional MIB/SIB formats and procedures may facilitate backward compatibility with prevision generations of mobile wireless communication systems, FBS attacks can take advantage of the open nature of RRC system information messages (e.g., MIB or SIB messages), by, for example, broadcasting by a FBS fake cell information by attracting (e.g., via a strong signal strength) a UE to attach to the FBS to expose credential information.

With embodiments disclosed herein, a UE may implement a protection mechanism to authenticate, or validate, that MIB or SIB messages received by the UE are received from a legitimate base station/gNB/RAN, while maintaining compatibility with wireless communication systems earlier than 5G. Embodiments disclosed herein may comprise a protection mechanism to authenticate a RAN that imposes minimal impact on both a UE and the RAN with respect to connection performance (e.g., time to establish a connection between the UE and the RAN). Embodiments disclosed herein may facilitate, or make use of, efficient generation of pairwise keys (e.g., public and private keys corresponding to a legitimate RAN). Embodiments disclosed herein may facilitate signing and verification being performed within MIB/SIBs broadcasting periods (e.g., an MIB broadcasting periodicity of 80 ms, and SIB broadcasting periodicity of 160 ms. Embodiments disclosed herein may facilitate digital signature signing and verification being performed with within approximately 100 μSec. Embodiments disclosed herein may facilitate digital signature strength being equivalent to 128 bits security level, such as, for example, specified Embodiments disclosed herein may facilitate timing attack resistance and resistance to other side channel attacks. Embodiments disclosed herein may use a digital signature that is small enough to be carried by a signaling message, such as an SIB message.

Figure 4A:
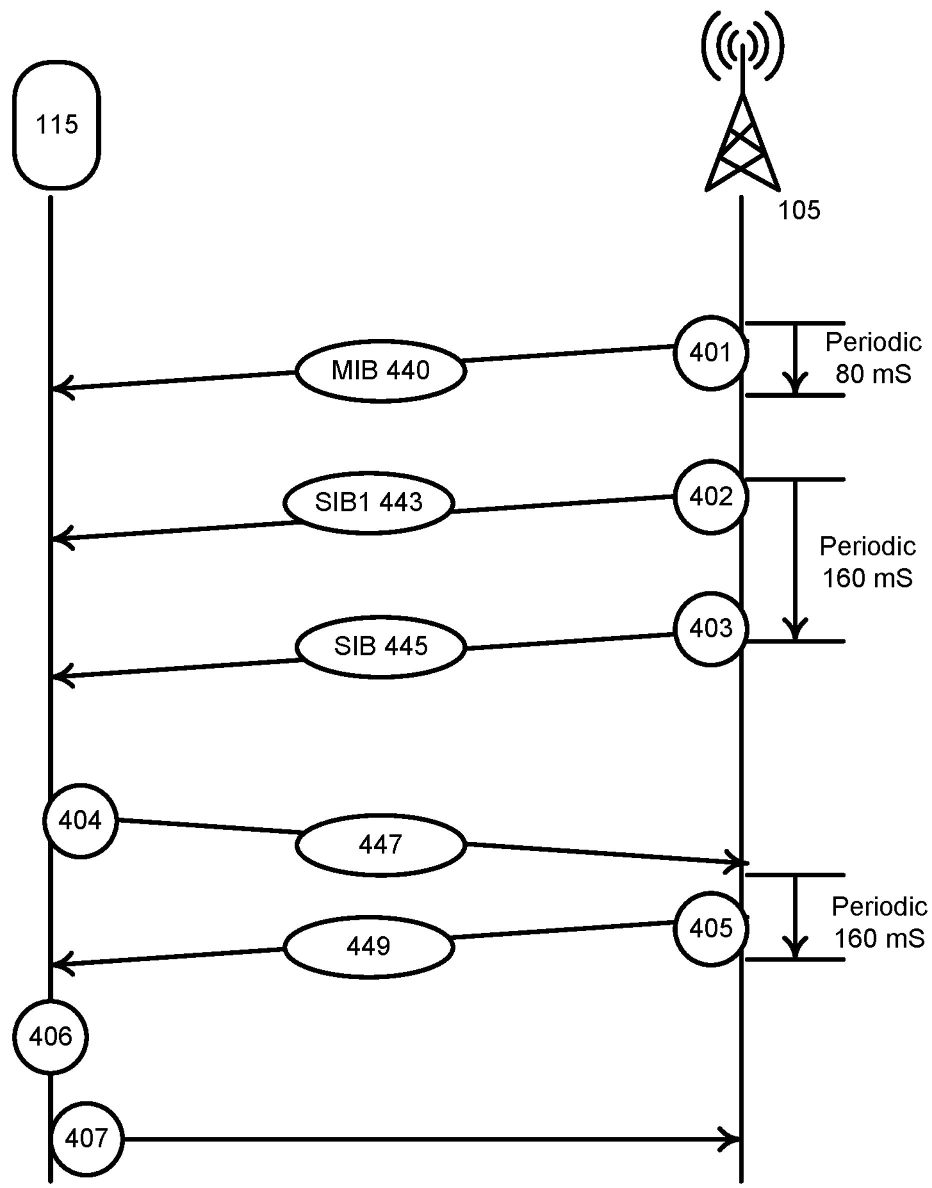
FIG. 4A illustrates a timing diagram of an example radio access network node authentication method using on demand digital signature based on on demand digital signature information in, or indicated by, an on demand digital signature request transmitted by a user equipment.

Turning now to FIG. 4A, the figure illustrates a timing diagram 400 of an example embodiment. At act 401, radio access network node 105 may transmit a master information block message 440 to user equipment 115. The master information block message 440 may be referred to as a connection establishment message. To avoid rearranging current 5G NR MIB/SIBs acquisition process messages, or formats corresponding thereto, and to maintain backward compatibility with respect to existing UE devices or previous generations of wireless communication system, a spare bit in an MIB frame (e.g., an MIB message 440), may be used to indicate an on demand digital signature capability. A '1' or a '0' may be used in the spare bit to indicate an on demand digital signature capability and may be referred to as an on demand digital signature capability indication. On demand digital signature capability may refer to a capability of a RAN to facilitate a UE authenticating/verifying the RAN as being a legitimate RAN based on MIB 440, SIB1 443, or another SIB message.

At act 402, radio access network node 105 may transmit SIB1 message 443 to user equipment 115. In an embodiment, instead of an on demand digital signature capability indication being transmitted in MIB 440, an on demand digital signature capability indication may be transmitted in SIB1 443. By transmitting an on demand digital signature capability indication in SIB1 message 443, radio access network node 105 may not need to alter the format of, or information that goes into, MIB 440. At act 403, radio access network node 105 may transmit one or more other SIB messages 445 (e.g., other than an SIB1 message) to user equipment 115.

At act 404, user equipment 115 may transmit an on-demand digital signature request message 447. On-demand digital signature request message 447 may comprise an indication indicative that an on demand digital signature being requested by message 447 is to be generated by radio access network node 105 based on MIB 440, SIB1 443, or one or more of SIB messages 445. Responsive to message 447, radio access network node 105 may, at act 405, transmit an on demand digital signature 449 to user equipment 115 at act 406. At act 406, user equipment 115 may determine whether on demand digital signature 449 transmitted by radio access network node 115 at act 405 was transmitted by a legitimate base station or a legitimate radio access network node. If a determination made it act 406 is that digital signature 449, and thus MIB 440 or SIB1 443, was transmitted by a legitimate base station or radio access network node, user equipment 115 may establish a communication session with radio access network node 105 at act 407. On demand digital signature request message 447 may be transmitted using a 5G NR feature that facilitates a user equipment requesting system information via on demand (e.g., request by a UE) SIB messages having a higher type than, for example, an SIB type 21 message (e.g., an SIB22 or higher message). For purposes of description, on demand digital signature 449 may be transmitted from radio access network node 105 to user equipment 115 via an on demand SIB message that may be referred to as an SIB22 message. It will be appreciated that the on demand digital signature 449 may be transmitted in a message other than an SIB22 message.

Figure 4B:
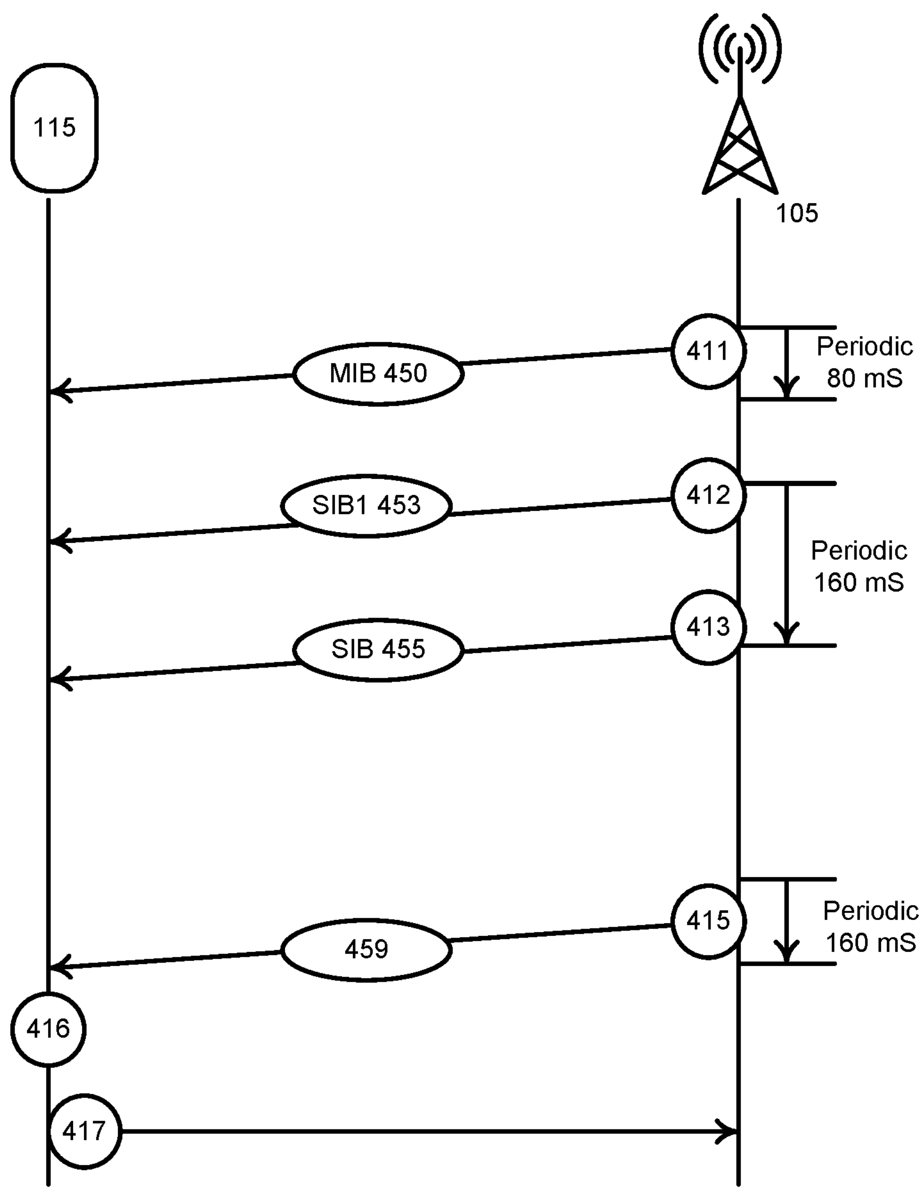
FIG. 4B illustrates a timing diagram of an example radio access network node authentication method using an on demand digital signature based transmitted by a radio access network node without having received from a user equipment an on demand digital signature request.

Turning now to FIG. 4B, the figure illustrates a timing diagram 455 corresponding to another embodiment. At act 411, radio access network node 105 may transmit a master information block message 450 to user equipment 115. MIB 450 may comprise an on demand digital signature capability indication as described in reference to MIB 440 shown in FIG. 4A. Continuing with description of FIG. 4B, at act 412, radio access network node 105 may transmit SIB1 message 453 to user equipment 115. In an embodiment, instead of an on demand digital signature capability indication being transmitted in MIB 450, an on demand digital signature capability indication may be transmitted in SIB1 453. By transmitting an on demand digital signature capability indication in SIB1 message 453, radio access network node 105 may not need to alter the format of, or information that goes into, MIB 450. At act 413, radio access network node 105 may transmit one or more other SIB messages 455 (e.g., SIB messages other than an SIB1 message) to user equipment 115.

According to the embodiment shown in FIG. 4B, instead of waiting for an on demand digital signature request, at act 415 radio access network node 105 may transmit on demand digital signature 459 to user equipment 115. On demand digital signature 459 may be based on one or more of MIB 450, SIB1 453, or one or more other SIB messages 455. Since user equipment 115 does not transmit to radio access network node 105 an on demand digital signature request message indicative of one or more of MIB 450, SIB1 453, or one or more SIBs 455, the user equipment may retain MIB 450, SIB1 453, or one or more SIBs 455 transmitted by the radio access network node to use in determining at act 416 whether on demand digital signature 459, and thus MIB 450, SIB1 453, or one or more SIBs 455, were transmitted by a legitimate radio access network node. If user equipment 115 determines at act 416 that on demand digital signature 459, and thus MIB 450, SIB1 453, or one or more SIBs 455, were transmitted by a legitimate radio access network node, the user equipment establishes a communication session with the legitimate radio access network node (e.g., RAN 105) at act 417.

Figure 4C:
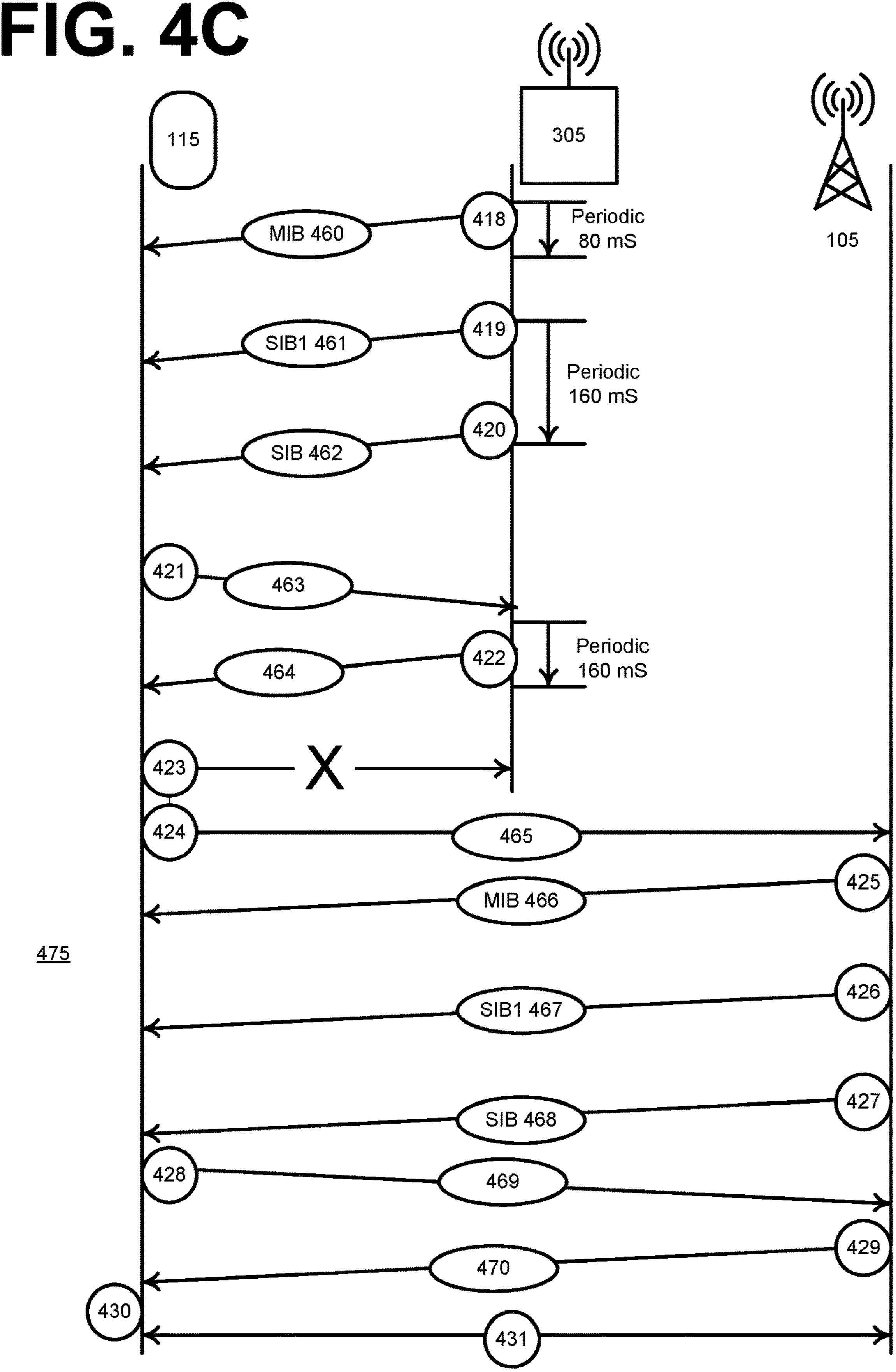
FIG. 4C illustrates a timing diagram of an example radio access network node authentication method rejecting connection with a false base station and authenticating, and connecting to, a legitimate base station based on an on demand digital signature.

Turning now to FIG. 4C, the figure illustrates a timing diagram 475 of an example method embodiment to detect a FBS attack and to reject connection with FSB 205 that attempted the attack. At act 418, FSB 305 may transmit a master information block message 460 to user equipment 115. MIB 460 may comprise an on demand digital signature capability indication as described in reference to MIB 440 shown in FIGS. 4A and 4B. Continuing with description of FIG. 4C, at act 419, FSB 305 may transmit SIB1 message 461 to user equipment 115. In an embodiment, instead of an on demand digital signature capability indication being transmitted in MIB 460, an on demand digital signature capability indication may be transmitted in SIB1 461. By transmitting an on demand digital signature capability indication in SIB1 message 461, FSB 305 may not need to alter the format of, or information that goes into, MIB 460. At act 420, FSB 305 may transmit one or more other SIB messages 462 (e.g., other than an SIB1 message) to user equipment 115.

At act 421, user equipment 115 may transmit, to FSB 305, an on demand digital signature request message 463. Responsive to the demand digital signature request message 463, at act 422, FSB 305 may transmit to user equipment 115 on demand digital signature 464. On demand digital signature request message 463 may comprise an on demand digital signature information indication indicative of on demand digital signature information on which the on demand digital signature is to be based. For example, the on demand digital signature information indication may indicate to FBS 305 one or more of MIB 460, SIB1 461, or one or more of other SIBs 462.

In an embodiment, instead of waiting for an on demand digital signature request 463, at act 422 FSB 305 may transmit on demand digital signature 464 to user equipment 115. On demand digital signature 464 may be based on one or more of MIB 460, SIB1 461, or one or more other SIB messages 462. Since user equipment 115 does not transmit, to FSB 305, an on demand digital signature request message indicative of one or more of MIB 460, SIB1 461, or one or more SIBs 462, the user equipment may retain MIB 460, SIB1 461, or one or more SIBs 462 transmitted by the radio access network node to use in determining at act 423 whether on demand digital signature 464, and thus MIB 460, SIB1 461, or one or more SIBs 462, were transmitted by a legitimate radio access network node.

If user equipment 115 determines at act 423 that on demand digital signature 464, and thus MIB 460, SIB1 461, or one or more SIBs 462, were not transmitted by a legitimate radio access network node, the user equipment may reject establishing a communication session with FSB 305. In addition, at act 423, user equipment 115 may update a barred RAN list to indicate that FSB 305 is a barred RAN. User equipment 115 may have attempted to connect with FBS 305 (e.g., attempted to decode MIB 460) based on a signal strength corresponding thereto being stronger than a signal strength corresponding to radio access network node 105, which may be a legitimate radio access network node. Upon determining that FBS 305 is not a legitimate radio access network node, and upon detecting a signal strength corresponding to radio access network node 105 that, although not as high as a signal strength corresponding to FBS 305, may be a second highest signal strength detected by user equipment 115, the user equipment may transmit to radio access network node 105 at act 424 the barred RAN list determined 465 at act 423, which barred RAN list may be referred to as an updated barred RAN list.

After rejecting establishment of a connection with FBS 205, at act 425 user equipment 115 may receive MIB 466 from radio access network node 105 based on a signal strength corresponding to radio access network node 105 being the next highest detected signal strength (e.g., a signal strength corresponding to FBS 205 may have been higher).

Radio access network node 105 may transmit at act 425 MIB 466, may transmit at act 426 SIB1 467, or may transmit at act 427 one or more other SIBs 468. At act 428, user equipment 115 may transmit to radio access network node 105 an on demand digital signature request message 469. Responsive to on demand digital signature request message 469, at act 429 radio access network node 105 may transmit on demand digital signature 470. At act 430 user equipment 115 may determine whether on demand digital signature 470 was transmitted by a legitimate radio access network node. If user equipment 115 determines that on demand digital signature 470 was transmitted by a legitimate radio access network node, at act 431 the user equipment may establish a communication connection with the legitimate radio access network node, which in the example is radio access network node 105.

Figure 5A:
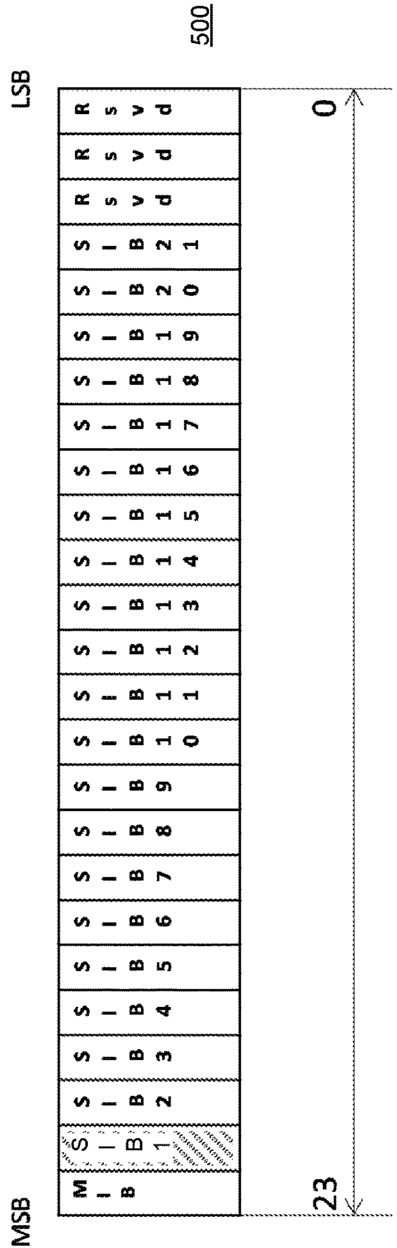
FIGS. 5A and 5B illustrate examples of on demand digital signature information in the form of a bitmap.
Figure 5B:
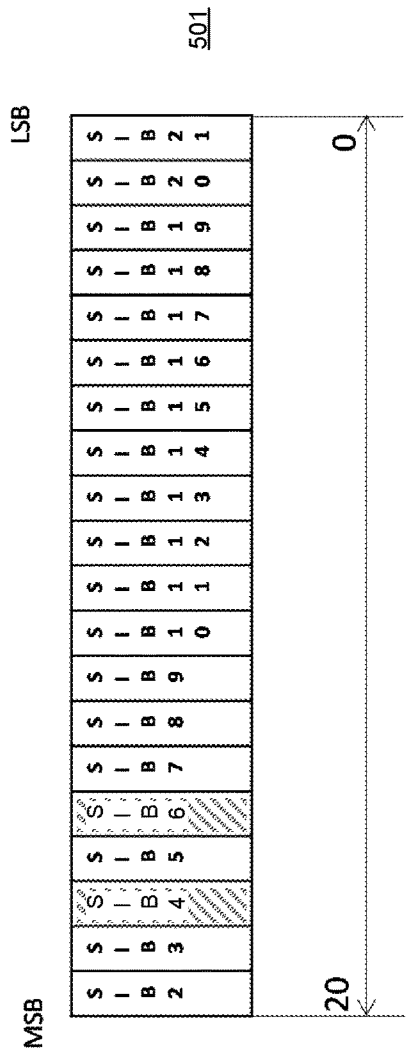

Turning now to FIG. 5A, the figure illustrates an example on demand digital signature request 500. Request 500 is shown as a 24-bit bitmap indicating, via cross hatching, that SIB1 is to be used by a radio access network node in generating an on demand digital signature. FIG. 5B illustrates an example on demand digital signature request 501. Request 501 is shown as a 20-bit bitmap indicating, via cross hatching, that SIB4 and SIB 6 are to be used by a radio access network node in generating an on demand digital signature. In an embodiment, a short bitmap shown in FIG. 5B may be indicative that an on demand digital signature is to be based at least on an MIB and an SIB1. A request, such as request 501, may be used to avoid interfering with the process of transmitting and processing of MIB or SIB1 messages.

A user equipment may use a key 614, such as a public key corresponding to legitimate radio access network node 105 shown in FIG. 3, to verify an on demand digital signature transmitted from the RAN via an on demand SIB. Public key 614 corresponding to a legitimate RAN may be generated by a network operator that operates the legitimate RAN. For purposes of discussion, public key 614 may be referred to as $PK_{RRC\_Sign}$. A network operator of a RAN may use a digital signature module, such as a module that implements Ed25519 for example, to generate pairwise keys (e.g., public key 614 and corresponding private/secret key 616, that may be referred to as $SK_{RRC\_Sign}$). In an example: ($PK_{RRC\_Sign}$, $SK_{RRC\_Sign}$):=cd25519_keygen(params). A length of $PK_{RRC\_Sign}$ and $SK_{RRC\_Sign}$ keys may be 32 bytes, or another number of bytes.

In an embodiment, a network operator may use an Ed25519 module with a seed to generate multiple unique pairwise keys that may be used to generate and verify an on demand digital signature. For example, ($PK_{RRC\_Sign\_id}$, $SK_{RRC\_Sign\_id}$):=Ed25519_keygen(params, seed). The seed may be an identifier corresponding to a legitimate RAN. A seed may be an identifier corresponding to a service area, such as a PLMN number that may be transmitted in an SIB1 message, which may indicate correspondence between a RAN node or a service area corresponding to a network operator. The unique public keys $PK_{RRC\_Sign}$ 614, or public key seeds $PK_{RRC\_Sign\_id}$, may be distributed by the mobile network operator that generated the public keys to multiple Subscriber Identify Modules ("SIM") for use in user equipment. The public keys 614 may be distributed electronically over the air. Unique private/secret keys $K_{RRC\_sign}$ 616, or private/secret key seeds $K_{RRC\_sign\_id}$, respectively corresponding to the unique public keys or seeds, may be distributed by the mobile network operator that generated the key pairs, or key seeds, for use by one or more RANs that are legitimately associated with the mobile network operator that generated the keys. The private/secret keys may be retained in legitimate RAN nodes to perform embodiments disclosed herein. After keys have been generated and distributed, a user equipment may power on and begin receiving MIB message that are broadcast by one or more RAN nodes. In an embodiment, to minimize key reuse attacks, a chain of key pairs labeled with key identifiers may be generated with the public keys thereof being stored in SIMs of UEs and with the private keys of the keypair chains being stored at RANs.

Upon receiving an MIB, for example as described in reference to FIG. 4C, a UE may evaluate the received MIB to determine whether the RAN that transmitted the MIB supports on demand digital signatures by determining whether the MIB contains a on demand digital signature capability indication. Table 2A illustrates an example MIB message with a spare bit being indicated as being deleted (e.g., with strikethrough) and being replaced with a on demand digital signature capability indication (e.g., via underlining) indicative that the RAN that transmitted the MIB supports, or is capable of, generating an on demand digital signature based on the MIB, an SIB, or other on demand digital signature information that may be included in a request by a user equipment that received the MIB. Table 2B shows the example MIB without the deleted spare bit instruction and the on demand digital signature capability indication without being underlined. The spare bit in the MIB in Table 2A is now replaced with a novel security capability field which may only use 1 bit to indicate whether the radio access network node that transmitted the MIB supports authentication of MIB/SIB messages to authenticate a RAN that transmitted the MIB or SIB(s).

TABLE 2A

```
MIB ::= SEQUENCE {
  systemFrameNumber            BIT STRING (SIZE (6)),
  subCarrierSpacingCommon      ENUMERATED {scs15or60, scs30or120},
  ssb-SubcarrierOffset         INTEGER (0..15),
  dmrs-TypeA-Position          ENUMERATED {pos2, pos3},
  pdcch-ConfigSIB1             INTEGER (0..255),
  cellBarred                   ENUMERATED {barred, notBarred},
  intraFreqReselection         ENUMERATED {allowed, notAllowed},
  spare                        BIT STRING (SIZE (1))
  Security Capability          ENUMERATED {NoSecurity, Security}
}
```

TABLE 2B

```
MIB ::= SEQUENCE {
  systemFrameNumber           BIT STRING (SIZE (6)),
  subCarrierSpacingCommon     ENUMERATED {scs15or60, scs30or120},
  ssb-SubcarrierOffset        INTEGER (0..15),
  dmrs-TypeA-Position         ENUMERATED {pos2, pos3},
  pdcch-ConfigSIB1          INTEGER (0..255),
  cellBarred                  ENUMERATED {barred, notBarred},
  intraFreqReselection        ENUMERATED {allowed, notAllowed},
  Security Capability         ENUMERATED {NoSecurity, Security}
}
```

In an embodiment, instead of using an MIB to carry an on demand digital signature capability indication, an SIB1 message may carry an on demand digital signature capability indication. A UE may receive and decode an MIB, and then store the MIB. Subsequently, the RAN that transmitted the MIB may transmit an SIB1 message according to a frame format that comprises an on demand digital signature capability indication field, as shown in Tables 3A and 3B.

TABLE 3A

```
SIB1 ::=     SEQUENCE {
  cellSelectionInfo         SEQUENCE {
    q-RxLevMin                Q-RxLevMin,
    q-RxLevMinOffset          INTEGER (1..8)      OPTIONAL,   -- Need R
    q-RxLevMinSUL             Q-RxLevMin          OPTIONAL,   -- Need R
    q-QualMin                 Q-QualMin           OPTIONAL,   -- Need R
    q-QualMinOffset           INTEGER (1..8)      OPTIONAL    -- Need R
  }  OPTIONAL,   -- Need S
  cellAccessRelatedInfo     CellAccessRelatedInfo :: SEQUENCE {
      plmn-IdentityList           plmn-IdentityList ,
      cellReservedForOtherUse       ENUMERATED {true} OPTIONAL, -- Need R
      Security Capability           ENUMERATED {NoSecurity, Security}
```

TABLE 3B

```
SIB1 ::=     SEQUENCE {
  cellSelectionInfo         SEQUENCE {
    q-RxLevMin                Q-RxLevMin,
    q-RxLevMinOffset          INTEGER (1..8)      OPTIONAL,   -- Need R
    q-RxLevMinSUL             Q-RxLevMin          OPTIONAL,   -- Need R
    q-QualMin                 Q-QualMin           OPTIONAL,   -- Need R
    q-QualMinOffset           INTEGER (1..8)      OPTIONAL    -- Need R
  }  OPTIONAL, -- Need S
  cellAccessRelatedInfo     CellAccessRelatedInfo :: SEQUENCE {
      plmn-IdentityList           plmn-IdentityList ,
      Security Capability           ENUMERATED {NoSecurity, Security}
```

An SIB1 message may comprise scheduling information regarding requesting of on demand system information, via, for example, an SIB22 message. Scheduling information is shown in Table 4.

TABLE 4

```
SI-SchedulingInfo ::= SEQUENCE {
  schedulingInfoList        SEQUENCE (SIZE (1..maxSI-Message)) OF SchedulingInfor,
  si-WindowLength           ENUMERATED {s5, s10, s20, s40, s80, s160, s320,
                              s640, s1280},
  si-RequestConfig          SI-RequestConfig OPTIONAL, -- Cond MSG-1::
  si-RequestConfigSUL       SI-RequestConfig OPTIONAL, -- Cond SUL-MSG-1
  systemInformationAreaID   BIT STRING (SIZE (24)) OPTIONAL, -- Need R
}
```

A UE may attempt to use information in a stored MIB to decode the SIB1 and may store decoded SIB1 message information. A UE may receive and decode other SIBs (e.g., in addition to an SIB1 message), and may store the SIBs. In an example, an on demand system information request message frame, which may be used to request an on demand digital signature from a RAN, may be requested according information in SIB1 message shown in Table 5. AuthRequestConfig Request Frame shown in Table 5 may indicate a bitmap format, such as shown in FIG. 5A or 5B, that may be used by a UE to request an on demand digital signature via an on demand digital signature request, which may comprise on an demand digital signature information indication as described herein, such as, for example, bitmap 500 or 501 shown in FIG. 5A or 5B, respectively, which may be indicated in a format indication as shown in Table 5. An SIB1 message may comprise information shown in Tables 3B, 4B, and 5. It will be appreciated that in the embodiment described in reference to FIG. 4B, a UE may not transmit to a RAN an on demand digital signature request if SIB1 message 453 does not indicate that the RAN will respond with an on demand digital signature. (In the embodiment shown in FIG. 4B, RAN 105 transmits on demand digital signature 459 without the on demand digital signature being requested by UE 115.)

TABLE 5

```
si-RequestConfig :: =SEQUENCE {
  ...
  SI-AuthRequestConfig :: = SEQUENCE {
    UE_RN    BIT STRING(SIZE(128))
    MessageToVerify    BIT STRING (SIZE(24))
}
```

In an embodiment, UE_RN may be a 128-bit random number generated by a UE based on a unique value corresponding to the UE, for example an International Mobile Subscriber Identifier ("IMSI") as the seed, to be input in a digital signature generation function module. A random number UE_RN may be used to prevent replay attacks and signature forgery attacks. In an example, UE_RN←RAND (IMSI). In the embodiment described in reference to FIG. 4B, UE_RN may not be generated since RAN 115 transmits on demand digital signature 459 without being request by UE 115. (A UE_RN may be included in on demand digital signature information transmitted by a UE to a RAN as part of an on demand digital signature request message.)

On demand digital signature information (e.g., bitmap 500 or 501 shown in FIGS. 5A and 5B, respectively) may correspond to the MessageToVerify field shown in Table 5, and may indicate one or more of an MIB, an SIB1, or one or more other SIBs. As shown in FIG. 5A, only SIB1 is indicated by cross hatching, thus indicating to a RAN that an on demand digital signature is to be based on an SIB1 message. If MIB and SIB1 had been shown both with cross hatching, the on demand digital signature information would have been indicative that a RAN is to generate an on demand digital signature based on the MIB and the SIB1 message. The length of the bitmap is 24 bits long in bitmap 500. In the bitmap embodiment 501 shown in FIG. 5B, the on demand digital signature information bitmap is 20 bits long and does not provide for an MIB or SIB1 being indicated as being a requested basis for generating by a RAN of an on demand digital signature. A 20-bit bitmap 501 may indicate that by default the RAN is to use an MIB and an SIB1 in addition to another SIB that may be indicated in bitmap 501. A 20-bit bitmap without the ability to indicate an MIB or an SIB1 may eliminate the ability to selectively choose whether MIB or SIB1 is to be the basis of a digital signature.

Figure 6:
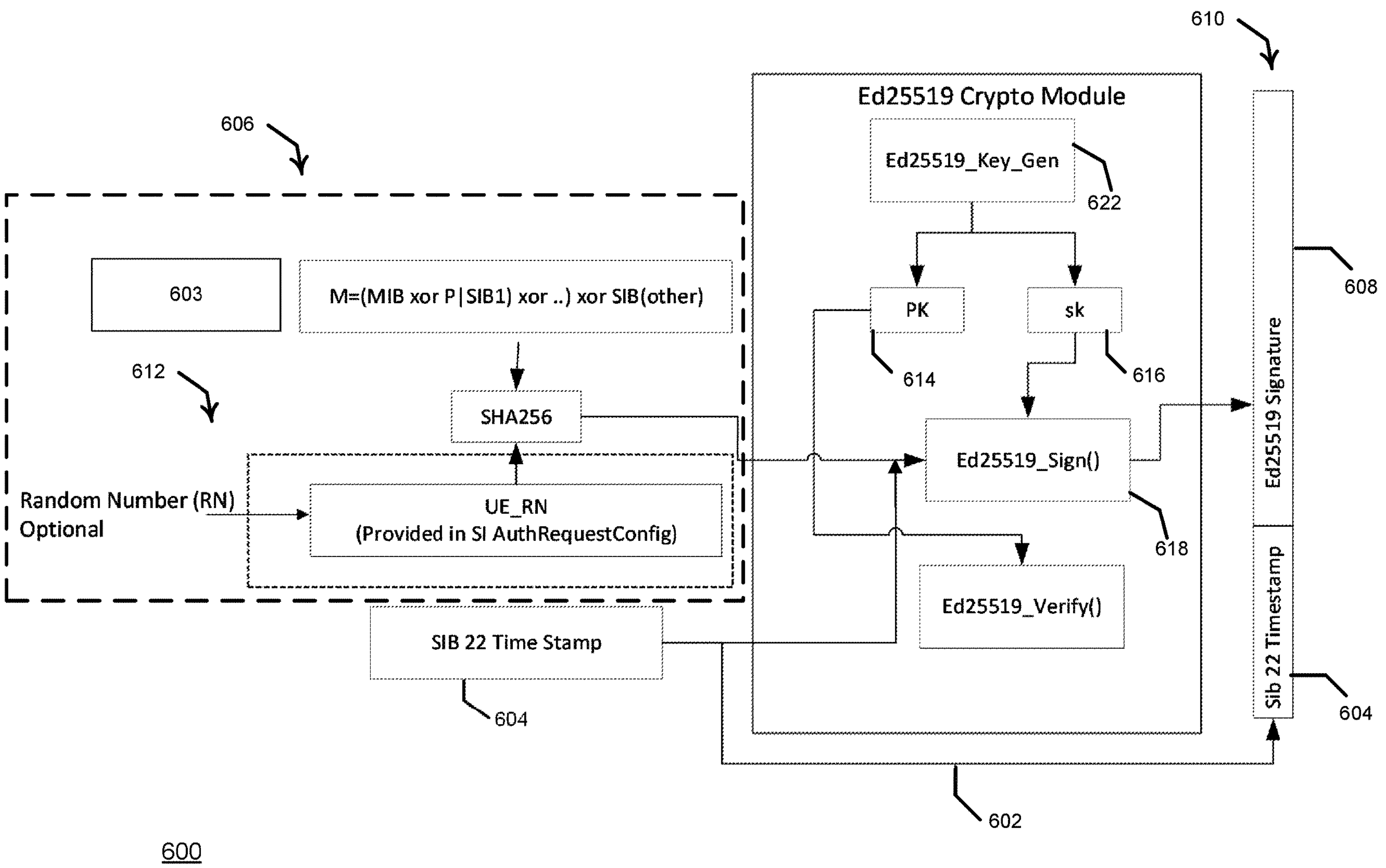
FIG. 6 illustrates an example block diagram of generating an on demand digital signature at a radio access network node.

Turning now to FIG. 6, (and in reference to Tables 3B, 4B, and 5), FIG. 6 illustrates an example block diagram 600 of generation of an on demand digital signature at a radio access network node. The RAN node may receive, from a user equipment, an on demand digital signature request message, for example, an si-RequestConfig message, comprising on demand digital signature information 606. The RAN node may process on demand digital signature information 606 with function 605, such as a hash function, to result in a digest of the on demand digital signature information. Digital signature module 602 may receive the digest and time stamp 604. In an example, digital signature module 602 may comprise Ed25519 cryptographic module functionality. On demand digital signature information 606 may comprise on demand digital signature information indication 603, that may comprise a bitmap, such as bitmap 500 or 501 shown in FIG. 5A or 5B, respectively. On demand digital signature information 606 may comprise a random number 612 generated by user equipment. The on demand digital signature information may comprise an indication, for example a message block indication such as a SI-AuthRequestConfig indication, that is indicative of messages to be processed by the RAN to result in the digest to be signed, or to be used to generate an on demand digital signature, by digital signature module 602. In an example, a message block indication received from the user equipment may comprise a MessageToVerify bitmap, such as a bitmap similar to bitmat 500 shown in FIG. 5A but that comprises the value "110100000000000000000000". In the example, on demand digital signature information 603 may comprise the bitmap and the RAN may retrieve the MIB, SIB1, and SIB3 messages that it previously broadcast, and generate the digest from those messages with function 605. The bitmap in the example may indicate that the user equipment has requested that MIB, SIB1, and SIB3 messages transmitted by the radio access network node are to be used by the radio access to generate an on demand digital signature, which is in turn to be used by the user equipment to verify/authenticate the message and thus the radio access network node. The RAN may process messages indicated by the bitmap according to a function, such as an exclusive OR function ("XOR"), which may be represented herein by the symbol '⊕'. In an embodiment, the MessageTo Verify bitmap may be a shorter version, such as 20-bit bitmap 501 shown in FIG. 5B, to be indicative that the MIB and SIB1 messages are to be signed by default. The user equipment may randomly choose which messages (e.g., MIB, SIB1, SIB2, . . . . SIB21) to indicate in on demand digital signature information that are to be verified to minimize the ability for a FBS to implement a record and replay attack in the middle between a legitimate radio access network node that transmitted connection establishment messages such as MIB and SIB1 messages and the user equipment. In an embodiment, such as the embodiment described in reference to FIG. 4B, radio access network node 105 may not wait to receive a si-RequestConfig message (e.g., an on demand digital signature request message) before generating and transmitting an on demand digital signature via an SIB message, such as an SIB22 message.

The RAN node may use messages indicated by bitmap to prepare a signature, for example using a hash-then-sign scheme to facilitate computational efficiency. In the example, a RAN node may be instructed, via an on demand digital signature request, to generate a digital signature based on an MIB, SIB1 and SIB3. If $M_1$=MIB, $M_2$=SIB1, $M_3$=SIB3, then the message to be hashed by function 605 may be $M=M_1 \oplus M_2 \oplus M3$. Since $M_1$, $M_2$ and $M_3$ may be different lengths, the shorter messages may be padded with 0's, resulting in the to be hashed message being $M=\oplus(\text{pad}(\oplus(\text{pad}(M_1, M_2)), M_3))$, wherein the pad (a, b) function may be used to pad the shorter message(s) to be the length of longer messages with 0's, and wherein the ⊕(a, b) function may be used to calculate a⊕b. In the embodiment described in reference to FIG. 4B, a user equipment may store all received MIB and SIBs message (including MSG2, MSG4, and any downlink RRC messages) since the embodiment does not use an uplink on demand digital signature request message to request that the RAN generate an on demand digital signature. It will be appreciated that the RAN node may also store sent MIB and SIBs messages (including the MSG2, MSG4 and any downlink RRC messages) for use in generating an on demand digital signature. In other examples, a padding scheme may comprise pad(·) that may be Padding Method 2 referenced in ISO/IEC 9797-1 or that may be another RFC 1321 padding scheme.

The RAN node may use hash function 605, which may be represented as H(·), to hash message M. In examples, hash function 605 may be SHA256 or SHA512. The result of performing hash function 605 of M may be M'=H(M, UE_RN). With the embodiment described in reference to FIG. 4B, there will be no UE_RN as input, in which case M'=H(M)—since the RAN node does not wait to receive an on demand digital signature request message the RAN node does not receive a random number generated by the UE. Depending on the hash function being used as function 605, the length of the result M' can be 256 bits or 512 bits, or another length.

The RAN node may use, for example, an Ed25519 sign function Ed25519_Sign (·) of module 602 to generate an on demand digital signature, which may be responsive to an on demand digital signature request (in the embodiment described in reference to FIG. 4B the UE 115 does not transmit an on demand digital signature request to RAN 105). The RAN node may provide result M' and time stamp 604 to module 602. Module 602 may use result M' and time stamp 602, along with private key 616 previously distributed to the RAN node as described above (e.g., $SK_{RRC\_Sign}$), to generate an on demand digital signature 608, which may be referred to as 'S', with signing block 618. (E.g., S=Ed25519_Sign(TimeStamp||M'; $SK_{RRC\_Sign}$), where the || denotes concatenation). As discussed with respect to the embodiment described in reference to FIG. 4B, a UE_RN (e.g., random number generated by a user equipment) is not generated and thus is not available to be fed into the signature generation block 618.

The RAN node may construct novel SIB message 610, for example an SIB22 message, that comprises on demand digital signature 608 generated by module 618. Message 610 may comprise time stamp 604. Message 610 may be constructed according to frame format shown in Table 6. In an example, timestamp 604 may comprise 24 bits and on demand digital signature 608 may comprise 64 bytes.

TABLE 6

```
SIBType 22::= SEQUENCE {
  TimeStamp            BIT STRING (SIZE (24)),
  Digital Signature    BIT STRING (SIZE (64bytes)),
}
```

Figure 7:
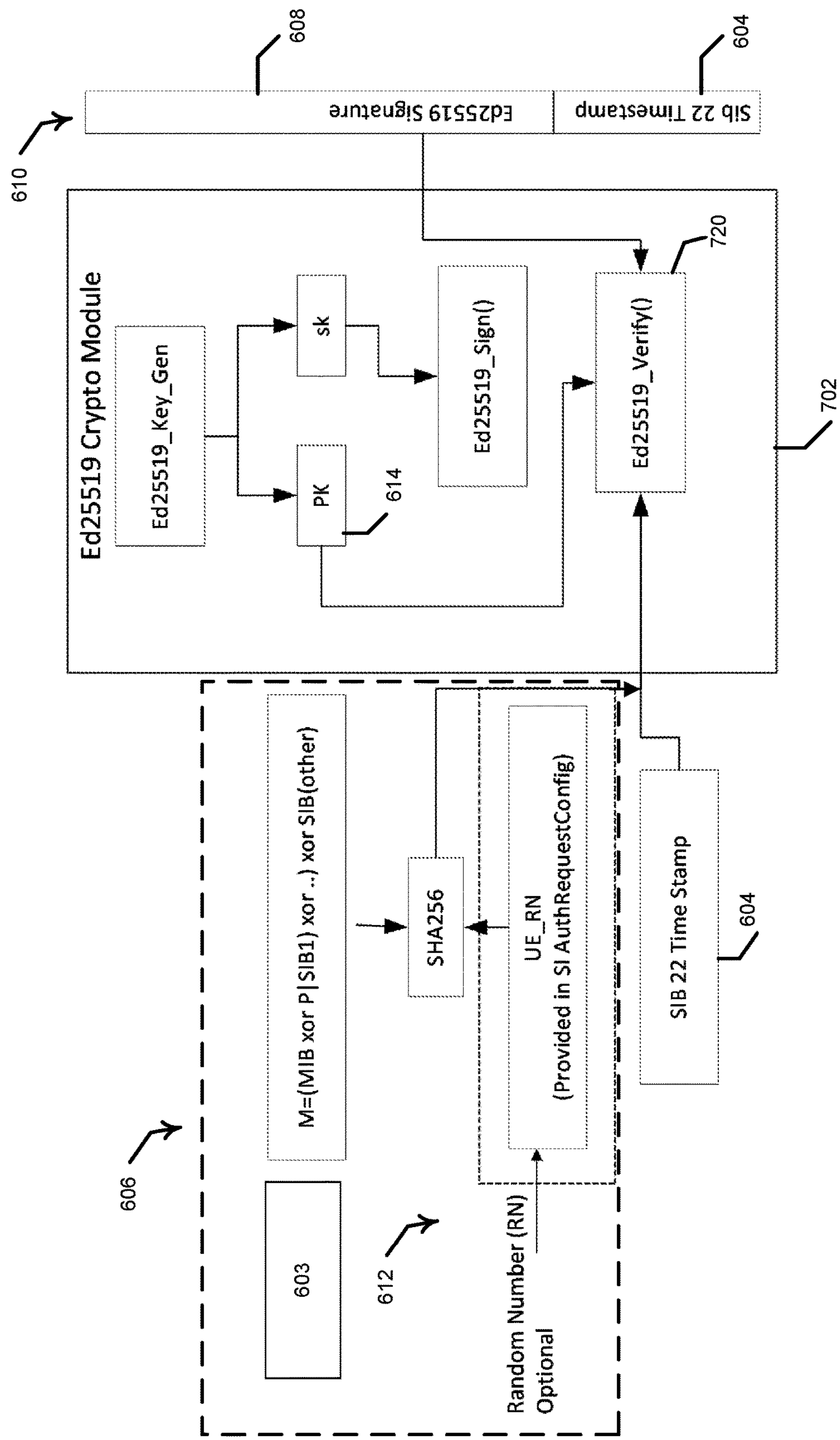
FIG. 7 illustrates an example block diagram of verifying an on demand digital signature at a user equipment.

Turning now to FIG. 7, (and in reference to Tables 3B, 4B, 5, and 6) FIG. 7 illustrates an example block diagram of verifying an on demand digital signature at a user equipment. UE may receive SIB22 message 610 from a RAN node. Using the public key 614 $PK_{RRC\_Sign}$ previously received as described above and stored MIB, SIBs messages, the UE may verify/authenticate the RAN node based on the on demand digital signature 608 and time stamp 604. The stored messages may be messages that the UE indicated in an on demand digital signature request message that are to be the basis of the RAN generating an on demand digital signature. In the embodiment described in reference to FIG. 4B, the UE may have stored the MIB and SIB message(s) based on an MIB or SIB1 message comprising an on demand digital signature capability indication. The UE can use digital signature information 606 and timestamp 604 to verify on-demand digital signature 608 received in message 610. As input to function 605 (e.g., the same function 605 used by the RAN described in reference to FIG. 6), the UE may perform an XOR operation on the stored MIB or SIB messages indicated in on demand digital signature information indication 603 that may have been included in an on demand digital signature request. The result M of the XOR operation on messages indicated by 603 and random number 612 (if provided in an on demand digital signature request) may be provided by the UE to function 605. The result M' of function 605 and time stamp 604 received in message 610 may be provided to verification block 720 of module 702 at the UE.

Module 702 may use the result M', timestamp 604, and public key 614 $PK_{RRC\_Sign}$ to generate a local digital signature to determine an authentication result, for example a determination whether digital signature 608 was transmitted by a legitimate RAN, and the UE may perform a connection establishment action based on the authentication result. For example, if digital signature 608 was not generated by the RAN using a private/secret key 616 that was previously generated as a complement to $PK_{RRC\_Sign}$ 614 used by the UE as an input to block 720, a local digital signature generated by block 720 will not match on demand digital signature 608 received in message 610 and the UE may reject connecting with the RAN that transmitted the MIB or SIB messages indicated by indication 603. If digital signature 608 was generated by the RAN using a private/secret key 616 that was previously generated as a complement to $PK_{RRC\_Sign}$ 614 used by the UE as an input to block 720, an output of block 720 should match on demand digital signature 608 received in message 610 and the UE may establish a connection with the RAN that transmitted the MIB or SIB messages indicated by indication 603. For example, Ed25519_Verify(S; Timestamp; $SK_{RRC\_Sign}$). If the verification result:==Yes, the UE may proceed to NAS attachment/connection establishment. If the result:==No, the UE may abort the MIB/SIBs acquisition and scan for a new MIB transmitted by another RAN that may have a lower signal strength than the RAN, or FBS, that transmitted the MIB/SIB message(s) that was not verified/authenticated by block 720. Upon aborting connecting with the FBS, the UE may update a barred RAN list with an identifier of the FBS to result in an updated barred RAN list and the UE may transmit the updated RAN list to another RAN after connecting with the other RAN.

Figure 8:
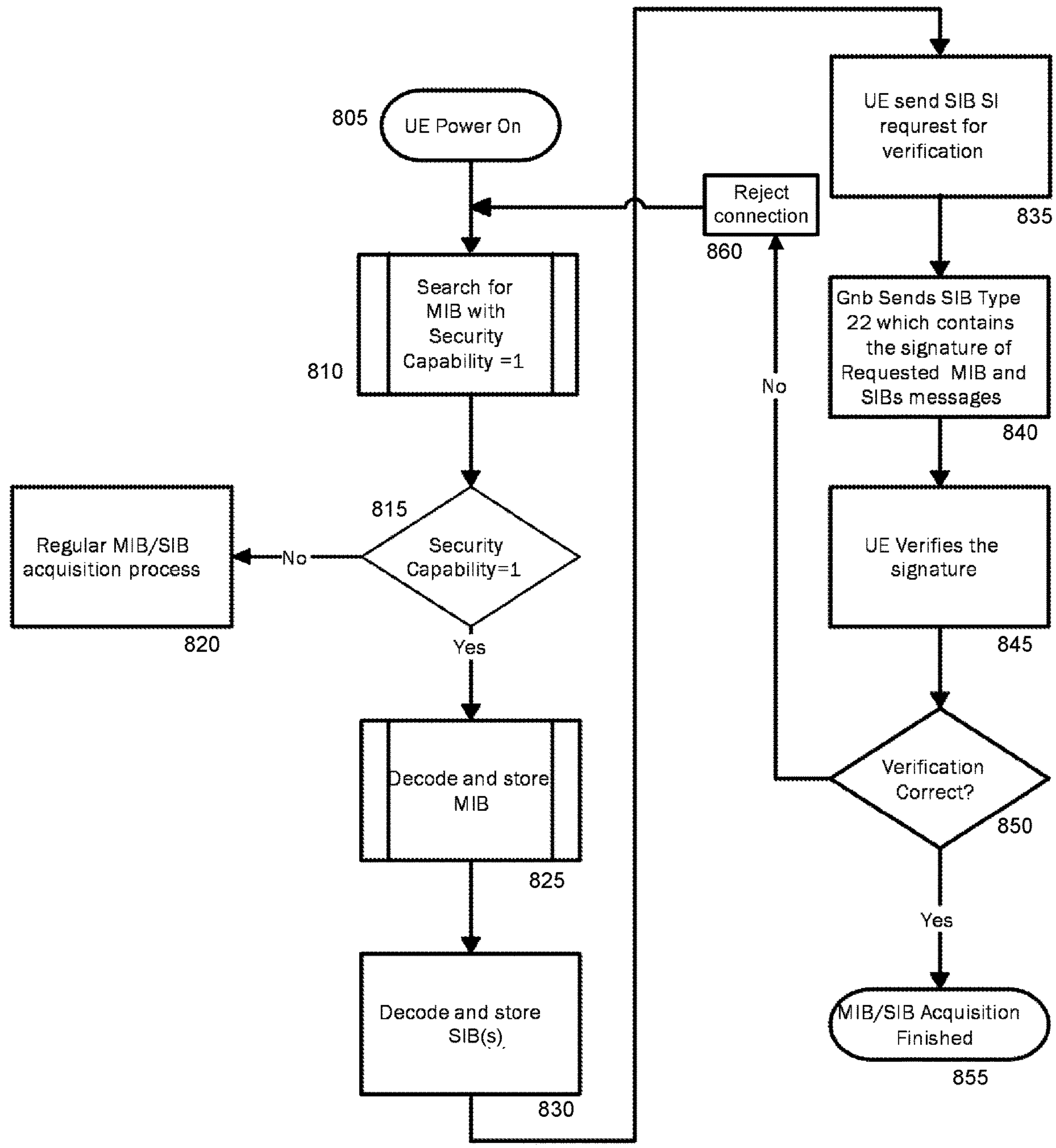
FIG. 8 illustrates a flow diagram of an example method to authenticate a radio access network node with a user equipment transmitting an on demand digital signature request requesting that an on demand digital signature request be based on an MIB message.

Turning now to FIG. 8, the figure illustrates a flow diagram of an example method to implement the embodiment shown in FIG. 4A if an MIB comprises an on demand digital signature capability indication. At act 805, a user equipment powers on and searches, at act 810, for an MIB message broadcast by a radio access network node providing a strongest signal strength with respect to other radio access network nodes that may be also broadcasting MIB messages. At act 815, the user equipment may determine whether an MIB message received and decoded by the user equipment comprises an on demand digital signature capability indication indicative of the radio access network node that transmitted the MIB message being capable of facilitating on demand digital signature operation. If a determination, made at 815, is that the RAN is not capable of facilitating on demand digital signature operation, the user equipment may continue a conventional process of receiving and decoding MIB and SIB messages at act 820.

If a determination is made, at act 815, that an MIB broadcast by a radio access network node having a higher signal strength comprises an on demand digital signature capability indication, the user equipment may decode and store the MIB message at act 825. After storing the MIB message at act 825, at act 830 the user equipment may decode and store one or more SIB messages based on information contained in the MIB message stored at act 825. Act 835, the user equipment may transmit, to the radio access network node that transmitted the MIB message that was detected at act 810, an on demand digital signature request message via an on demand system information request message. At act 840, responsive to the on demand digital signature request message transmitted by the user equipment at act 835, the radio access network node may transmit, to the user equipment via an on demand system information SIB message, which may be an SIB22 message, an on demand digital signature.

At act 845, the user equipment may generate a local digital signature using the same information included in the on demand digital signature request message transmitted at act 835 to determine whether the MIB message received at act 810 was broadcast by, or transmitted by, an illegitimate radio access network node. At act 850, the user equipment may determine whether the local digital signature matches the on demand digital signature received from the radio access network node in the SIB message at act 840. If a determination is made, at act 850, that the local digital signature matches the on demand digital signature received at act 840, the user equipment may proceed to establish a connection with the radio access network node that transmitted the MIB message detected at act 810.

However, if a determination made, at act 850, is that the local digital signature does not match the on demand digital signature received from the radio access network node at act 840, method 800 advances to act 860. At act 860, the user equipment may perform a connection establishment action that comprises rejecting a connection to the radio access network node that transmitted the MIB message detected at act 810. The connection establishment action performed at act 860 may comprise adding an identifier corresponding to the radio access network node that transmitted the message at act 810 to a barred RAN list to result in an updated barred RAN list. The connection establishment action performed at 860 may comprise transmitting the updated barred RAN list to a legitimate radio access network node.

Figure 9:
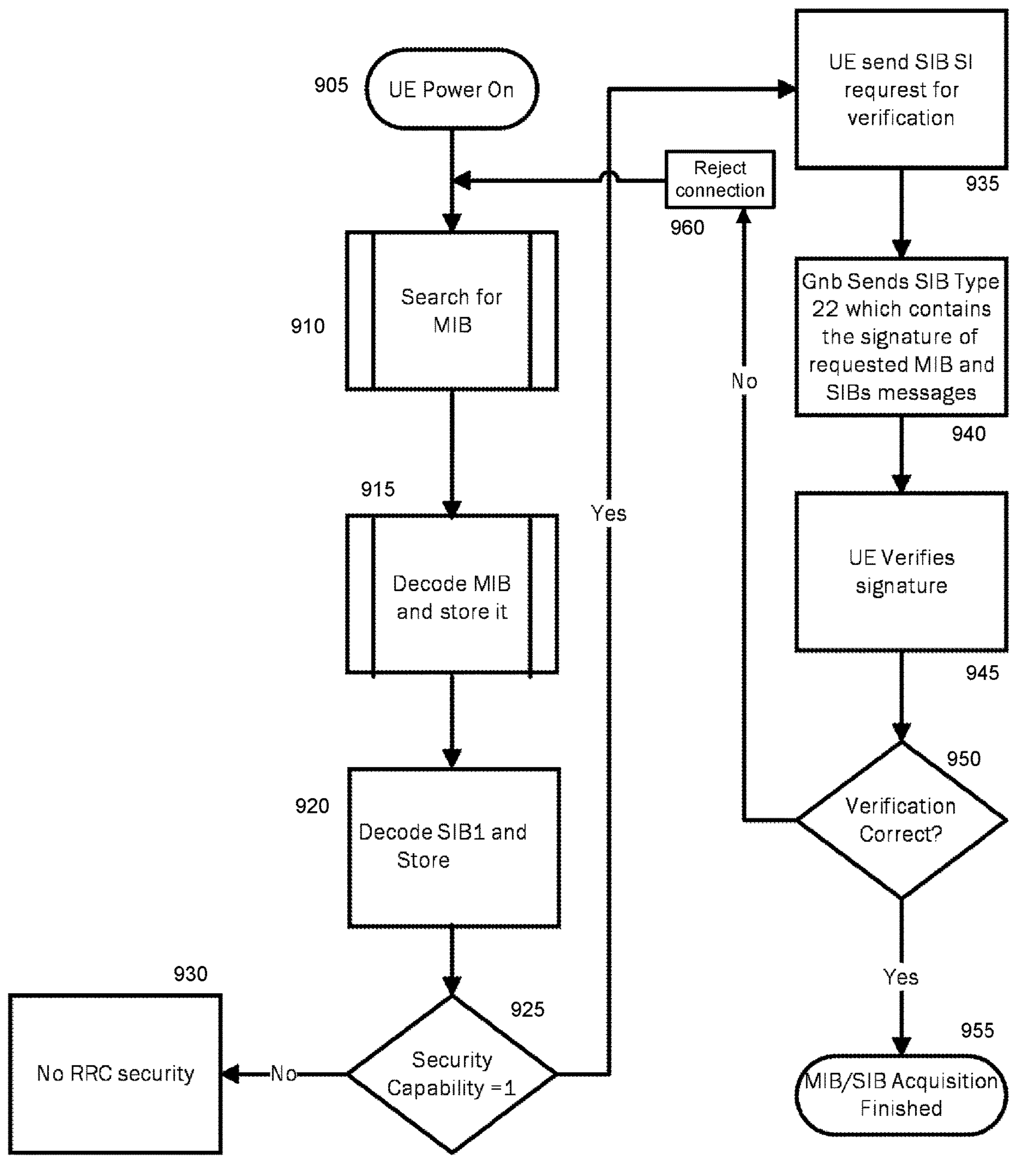
FIG. 9 illustrates a flow diagram of an example method to authenticate a radio access network node with a user equipment transmitting an on demand digital signature request requesting that an on demand digital signature request be based on an SIB1 message.

Turning now to FIG. 9, the figure illustrates a flow diagram of an example method to implement the embodiment shown in FIG. 4A if an SIB1, instead of an MIB, comprises an on demand digital signature capability indication. At act 905, a user equipment powers on and searches at act 910 for an MIB message broadcast by a radio access network node providing a strongest signal strength with respect to other radio access network nodes that may also be broadcasting MIB messages. At act 915, the user equipment may decode and store an MIB message detected at act 910. After storing the MIB message at act 915, at act 920 the user equipment may decode and store an SIB1 message based on information contained in the MIB message stored at act 915.

At act 925, the user equipment may determine whether an SIB1 message received and decoded by the user equipment comprises an on demand digital signature capability indication indicative of the radio access network node that transmitted the MIB message being capable of facilitating on demand digital signature operation. If a determination made, at act 925, is that the RAN is not capable of facilitating on demand digital signature operation, the user equipment continues a conventional process of receiving and decoding MIB and SIB messages at act 930.

If a determination is made, at act 925, that an SIB1 broadcast by the radio access network node comprises an on demand digital signature capability indication, the user equipment may transmit, at act 935, to the radio access network node that transmitted the SIB1 message that was decoded at act 920, an on demand digital signature request message via an on demand system information request message. At act 940, responsive to the on demand digital signature request message transmitted by the user equipment at act 935, the radio access network node may transmit to the user equipment via an on demand system information SIB message, which may be an SIB22 message, an on demand digital signature.

At act 945, the user equipment may generate a local digital signature using the same information included in the on demand digital signature request message transmitted at act 935 to determine whether the MIB message detected at act 910 or the SIB1 message decoded at act 920, was/were broadcast by, or transmitted by, an illegitimate radio access network node. At act 950, the user equipment may determine whether the local digital signature matches the on demand digital signature received from the radio access network node in the SIB message at act 940. If a determination is made, at act 950, that the local digital signature matches the on demand digital signature received at act 940, the user equipment may connection establishment action at act 955 that comprises establishing a connection with the radio access network node that broadcast the MIB message detected at act 910 and stored at act 915.

However, if a determination made, at act 950, is that the local digital signature does not match the on demand digital signature received from the radio access network node at act 940, method 900 advances to act 960. At act 960, the user equipment may perform a connection establishment action that comprises rejecting a connection to the radio access network node that broadcast the MIB message detected at act 910. The connection establishment action performed at act 960 may comprise adding an identifier corresponding to the radio access network node that transmitted the MIB message detected at act 910 to a barred RAN list to result in an updated barred RAN list. The connection establishment action performed at 960 may comprise transmitting the updated barred RAN list to a legitimate radio access network node.

Figure 10:
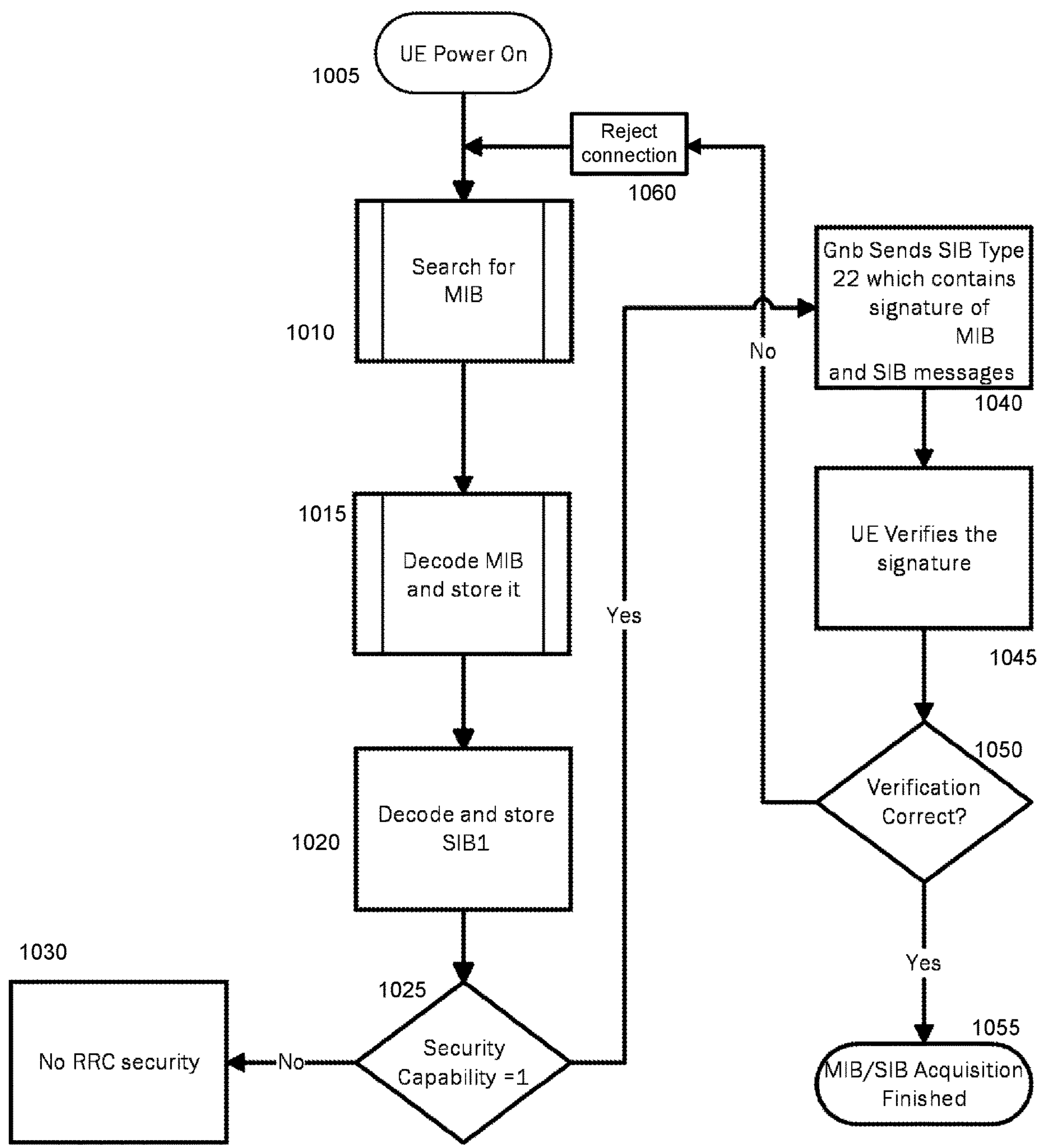
FIG. 10 illustrates a flow diagram of an example method to authenticate a radio access network node without a user equipment transmitting an on demand digital signature request.

Turning now to FIG. 10, the figure illustrates a flow diagram of an example method to implement the embodiment shown in FIG. 4C if a RAN transmits an on demand digital signature via an on demand SIB, such as an SIB22, without having received an on demand digital signature request from a UE. At act 1005, a user equipment powers on and searches at act 1010 for an MIB message broadcast by a radio access network node providing a strongest signal strength with respect to other radio access network nodes that may also be broadcasting MIB messages. At act 1015, the user equipment may decode and store an MIB message detected at act 1010. After storing the MIB message at act 1015, at act 1020 the user equipment may decode and store an SIB1 message based on information contained in the MIB message stored at act 1015. The UE may receive, decode, and store other SIB messages, in addition to an SIB1 message, at act 1020.

At act 1025, the user equipment may determine whether a message received and decoded by the user equipment comprises an on demand digital signature capability indication indicative of the radio access network node that transmitted the MIB message being capable of facilitating on demand digital signature operation. If a determination made, at act 1025, is that the RAN is not capable of facilitating on demand digital signature operation, the user equipment continues a conventional process of receiving and decoding MIB and SIB messages at act 1030.

If a determination is made, at act 1025, that an SIB1, or other message, broadcast by the radio access network node comprises an on demand digital signature capability indication, instead of waiting to receive from a UE an on demand digital signature request message as described in reference to FIG. 8 or FIG. 9, the radio access network node may at act 1040 transmit to the user equipment via an on demand system information SIB message, which may be an SIB22 message, an on demand digital signature.

At act 1045, the user equipment may generate a local digital signature using the MIB stored at act 1015 and the SIB1 message and other SIB messages, if any, stored at act 1020 to determine whether the MIB message or the SIB1 message, and other messages, if any, were broadcast by, or transmitted by, an illegitimate radio access network node. At act 1050, the user equipment may determine whether the local digital signature matches the on demand digital signature received from the radio access network node in the SIB message at act 1040. If a determination is made, at act 1050, that the local digital signature matches the on demand digital signature received at act 1040, the user equipment may proceed to establish a connection with the radio access network node that broadcast the MIB message stored at act 1015.

However, if a determination made, at act 1050, is that the local digital signature does not match the on demand digital signature received from the radio access network node at act 1040, method 1000 advances to act 1060. At act 1060, the user equipment may perform a connection establishment action that comprises rejecting a connection to the radio access network node that broadcast the MIB message detected at act 1010. The connection establishment action performed at act 1060 may comprise adding an identifier corresponding to the radio access network node that transmitted the MIB message detected at act 1010 to a barred RAN list to result in an updated barred RAN list. The connection establishment action performed at 1060 may comprise transmitting the updated barred RAN list to a legitimate radio access network node.

Figure 11:
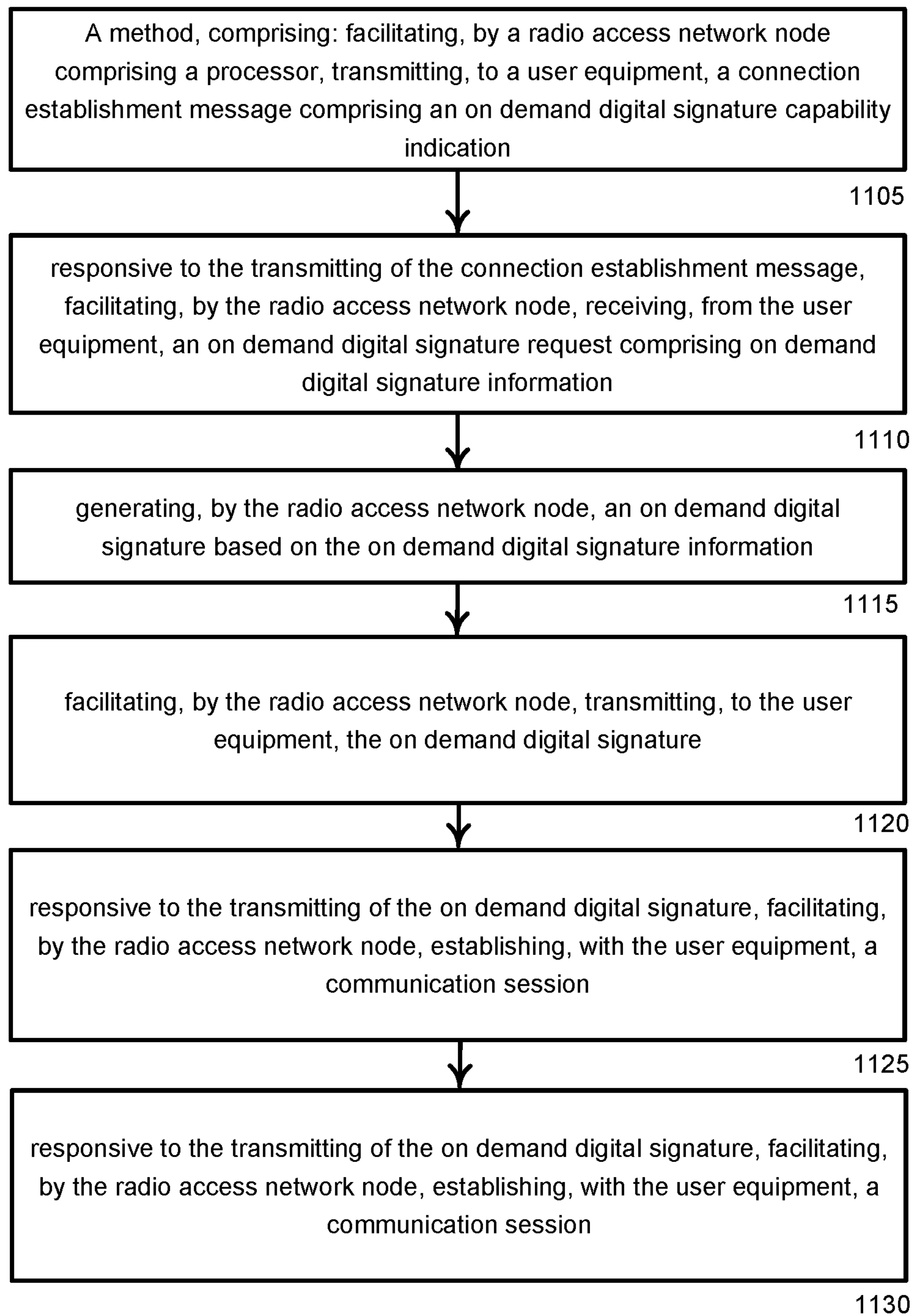
FIG. 11 illustrates a block diagram of an example method.

Turning now to FIG. 11, the figure illustrates an example embodiment method 1100 comprising at block 1105 facilitating, by a radio access network node comprising a processor, transmitting, to a user equipment, a connection establishment message comprising an on demand digital signature capability indication; at block 1110 responsive to the transmitting of the connection establishment message, facilitating, by the radio access network node, receiving, from the user equipment, an on demand digital signature request comprising on demand digital signature information; at block 1115 generating, by the radio access network node, an on demand digital signature based on the on demand digital signature information; at block 1120 facilitating, by the radio access network node, transmitting, to the user equipment, the on demand digital signature; at block 1125 responsive to the transmitting of the on demand digital signature, facilitating, by the radio access network node, establishing, with the user equipment, a communication session; and at block 1130 responsive to the transmitting of the on demand digital signature, facilitating, by the radio access network node, establishing, with the user equipment, a communication session.

Figure 12:
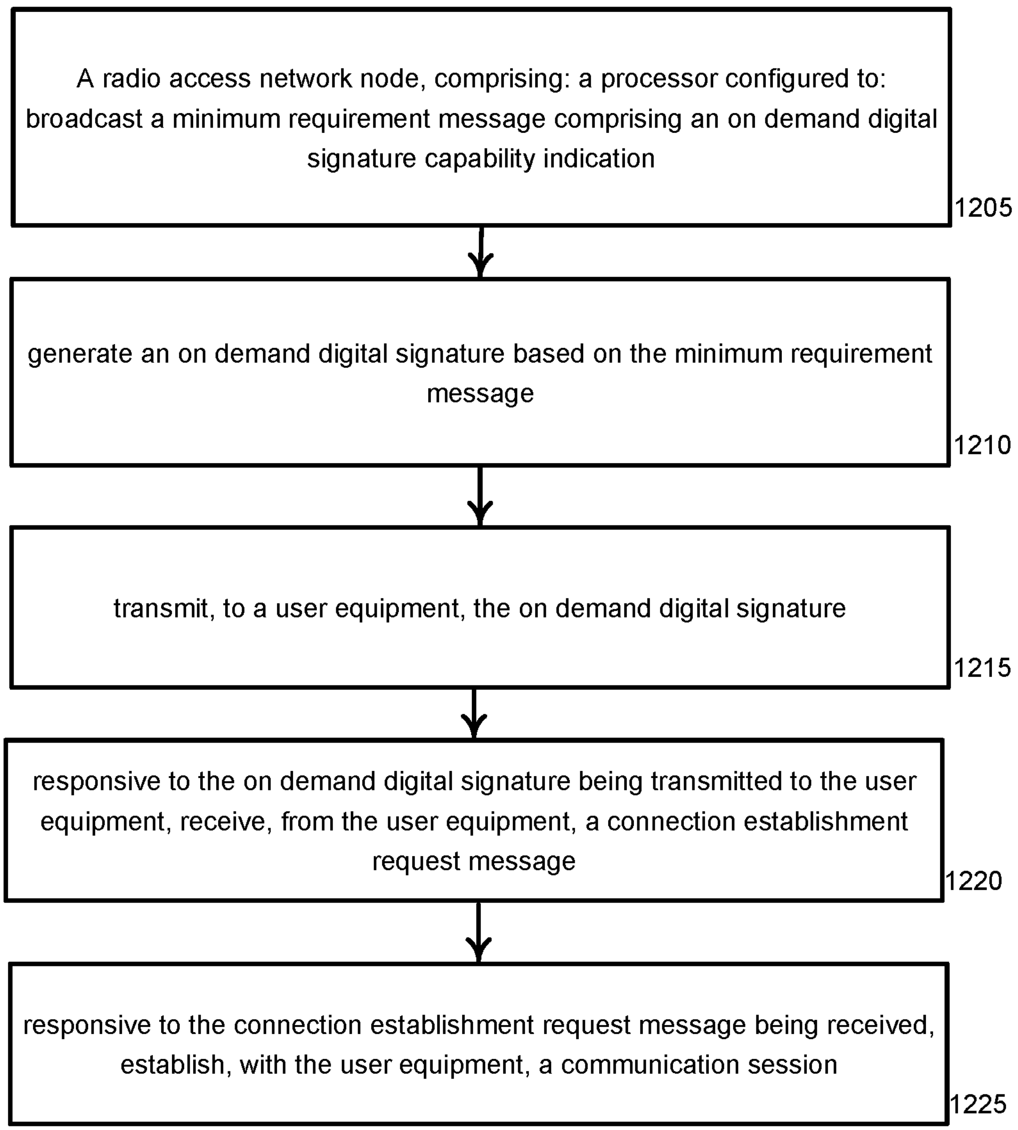
FIG. 12 illustrates a block diagram of an example radio access network node.

Turning now to FIG. 12, the figure illustrates a radio access network node 1200, comprising at block 1205 a processor configured to broadcast a minimum requirement message comprising an on demand digital signature capability indication; at block 1210 generate an on demand digital signature based on the minimum requirement message; at block 1215 transmit, to a user equipment, the on demand digital signature; at block 1220 responsive to the on demand digital signature being transmitted to the user equipment, receive, from the user equipment, a connection establishment request message; and at block 1225 responsive to the connection establishment request message being received, establish, with the user equipment, a communication session.

Figure 13:
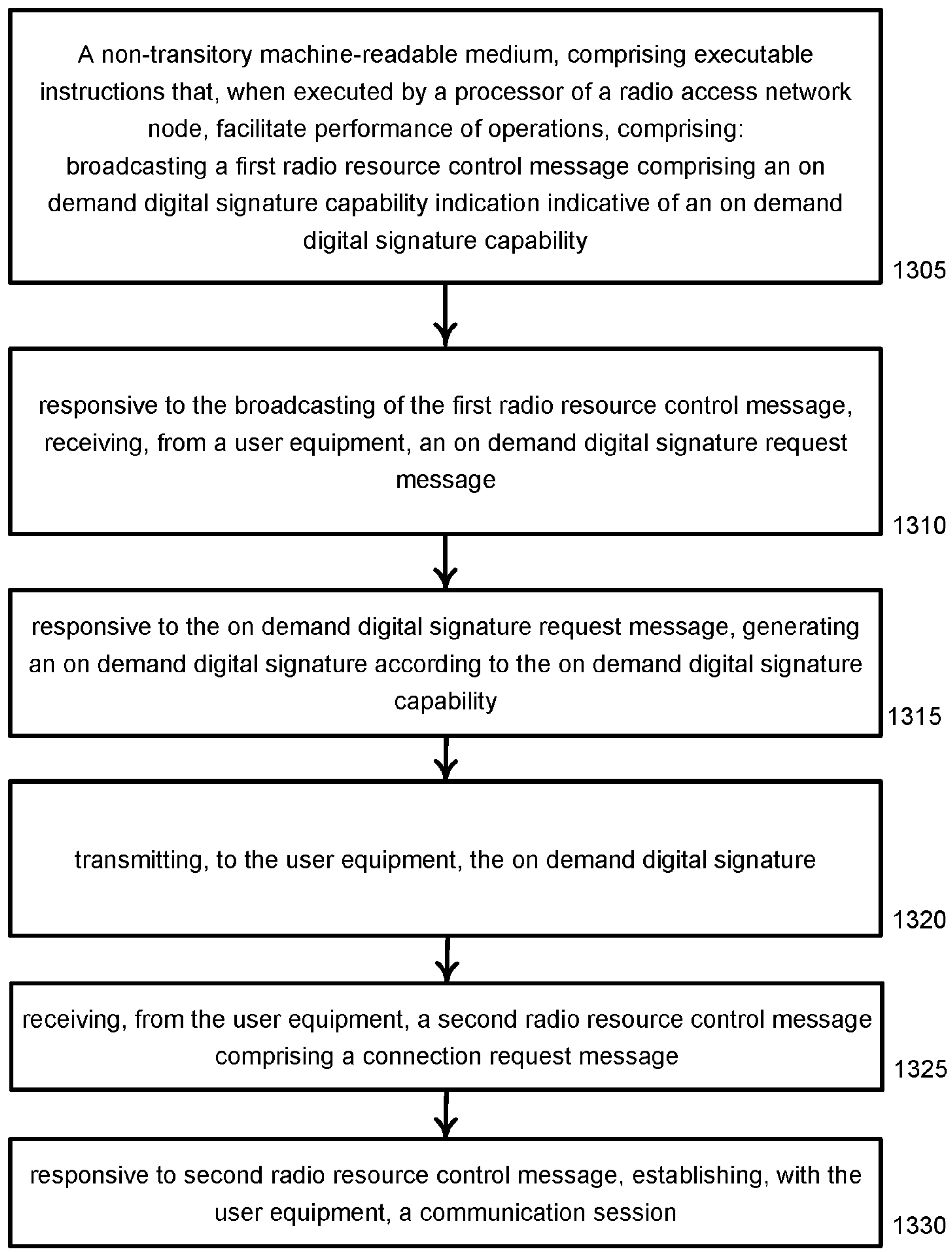
FIG. 13 illustrates a block diagram of an example non-transitory machine-readable medium.

Turning now to FIG. 13, the figure illustrates a non-transitory machine-readable medium 1300 comprising at block 1305 executable instructions that, when executed by a processor of a radio access network node, facilitate performance of operations, comprising broadcasting a first radio resource control message comprising an on demand digital signature capability indication indicative of an on demand digital signature capability; at block 1310 responsive to the broadcasting of the first radio resource control message, receiving, from a user equipment, an on demand digital signature request message; at block 1315 responsive to the on demand digital signature request message, generating an on demand digital signature according to the on demand digital signature capability; at block 1320 transmitting, to the user equipment, the on demand digital signature; at block 1325 receiving, from the user equipment, a second radio resource control message comprising a connection request message; and at block 1330 responsive to second radio resource control message, establishing, with the user equipment, a communication session.

Figure 14:
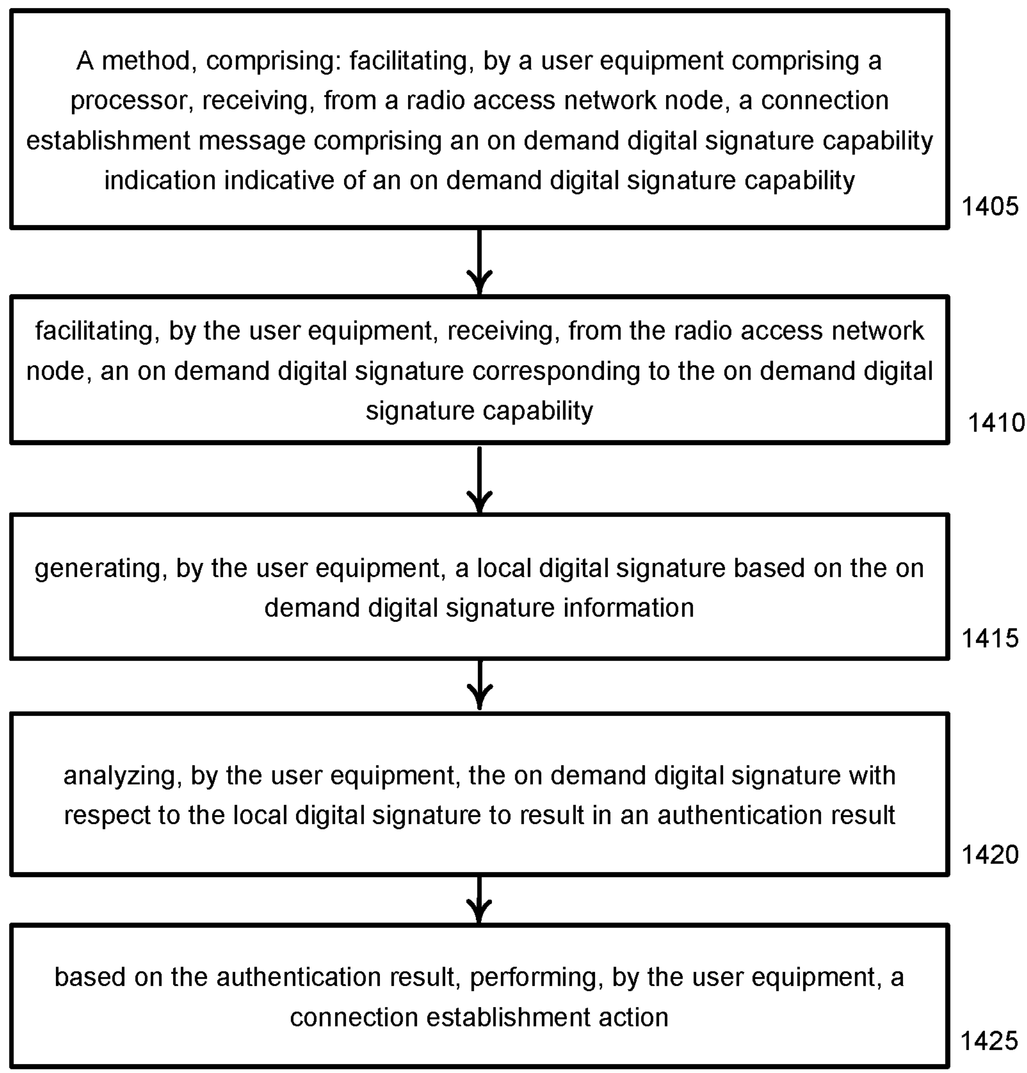
FIG. 14 illustrates a block diagram of an example method.

Turning now to FIG. 14, the figure illustrates an example embodiment method 1400 comprising at block 1405 facilitating, by a user equipment comprising a processor, receiving, from a radio access network node, a connection establishment message comprising an on demand digital signature capability indication indicative of an on demand digital signature capability; at block 1410 facilitating, by the user equipment, receiving, from the radio access network node, an on demand digital signature corresponding to the on demand digital signature capability; at block 1415 generating, by the user equipment, a local digital signature based on the on demand digital signature information; at block 1420 analyzing, by the user equipment, the on demand digital signature with respect to the local digital signature to result in an authentication result; and at block 1425 based on the authentication result, performing, by the user equipment, a connection establishment action.

Figure 15:
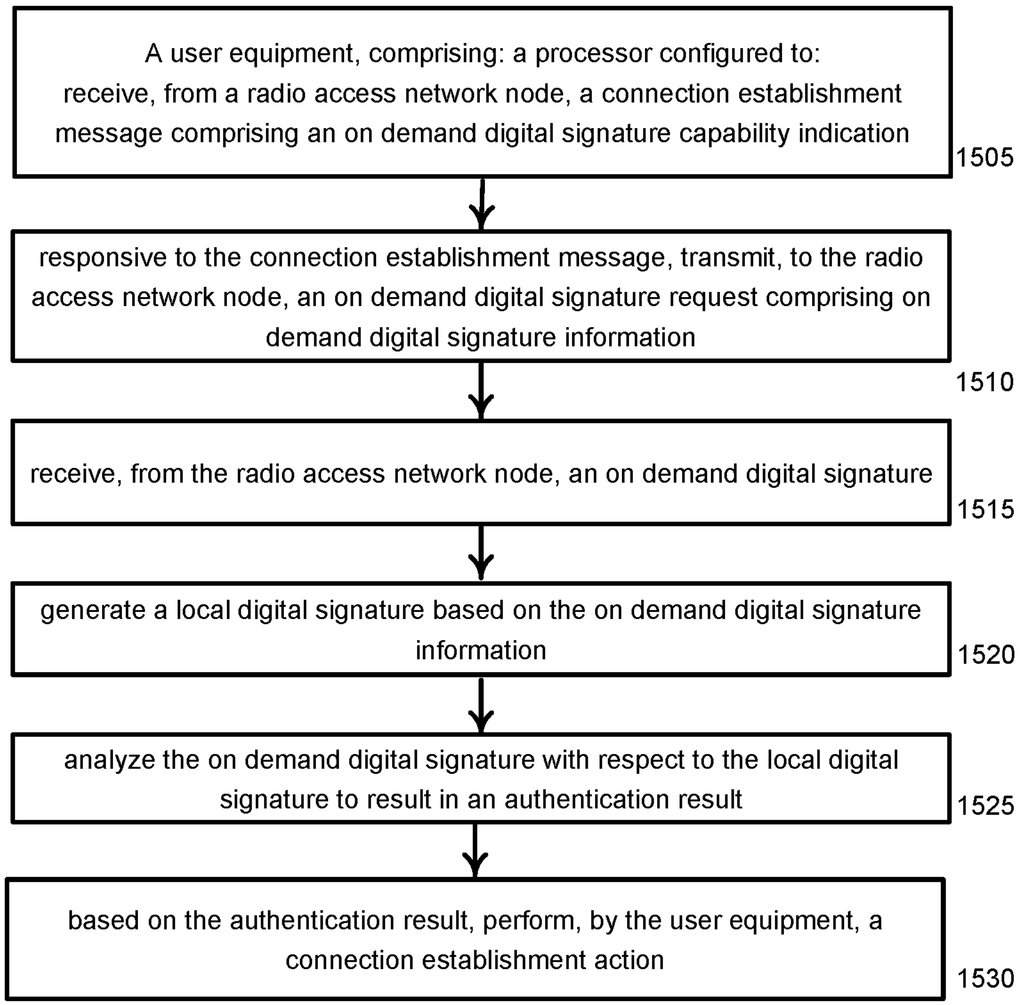
FIG. 15 illustrates a block diagram of an example user equipment.

Turning now to FIG. 15, the figure illustrates an example user equipment 1500, comprising at block 1505 a processor configured to receive, from a radio access network node, a connection establishment message comprising an on demand digital signature capability indication; at block 1510 responsive to the connection establishment message, transmit, to the radio access network node, an on demand digital signature request comprising on demand digital signature information; at block 1515 receive, from the radio access network node, an on demand digital signature; at block 1520 generate a local digital signature based on the on demand digital signature information; at block 1525 analyze the on demand digital signature with respect to the local digital signature to result in an authentication result; and at block 1530 based on the authentication result, perform, by the user equipment, a connection establishment action.

Figure 16:
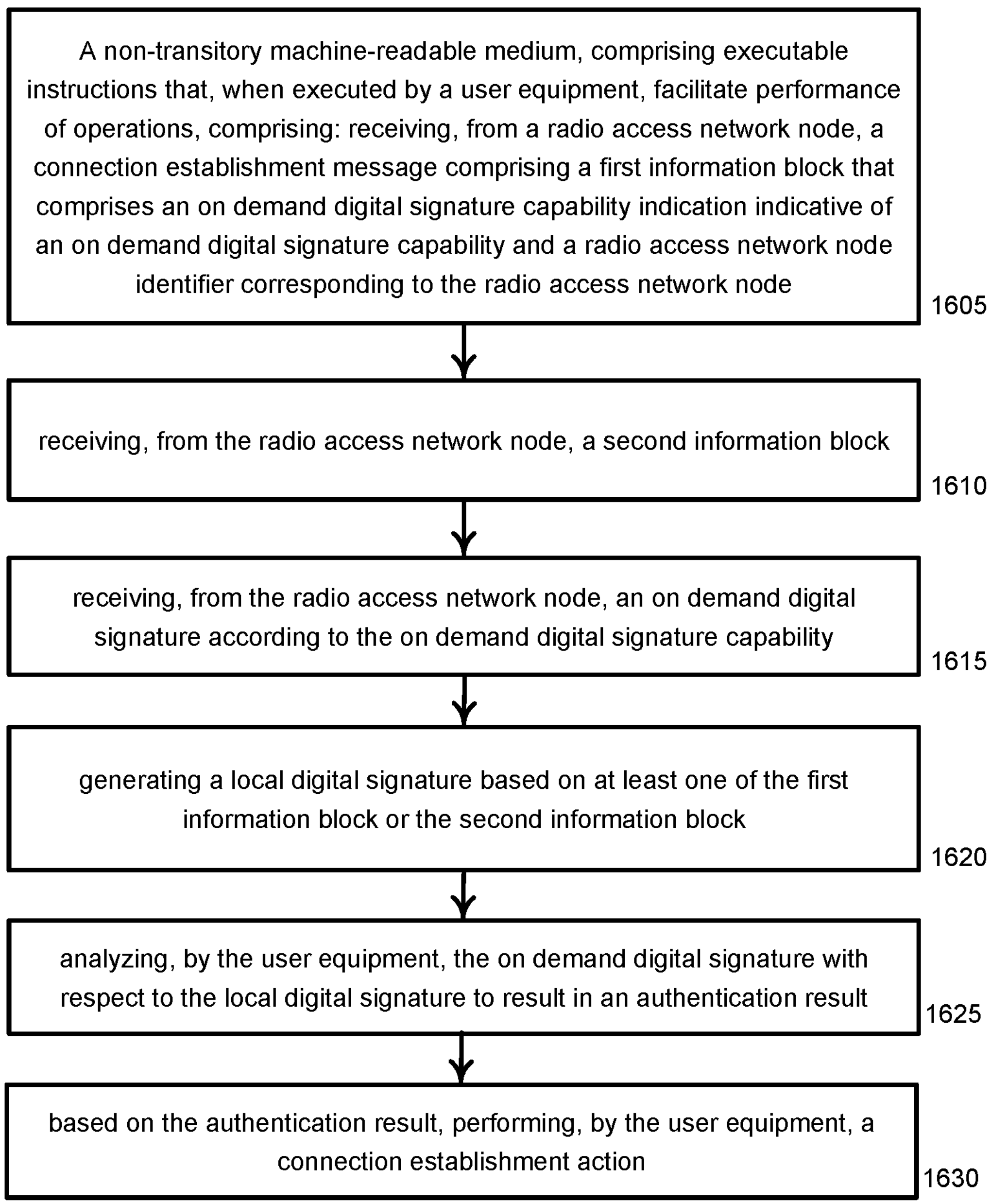
FIG. 16 illustrates a block diagram of an example non-transitory machine-readable medium.

Turning now to FIG. 16, the figure illustrates a non-transitory machine-readable medium 1600 comprising at block 1605 executable instructions that, when executed by a processor of a user equipment, facilitate performance of operations, comprising receiving, from a radio access network node, a connection establishment message comprising a first information block that comprises an on demand digital signature capability indication indicative of an on demand digital signature capability and a radio access network node identifier corresponding to the radio access network node; at block 1610 receiving, from the radio access network node, a second information block; at block 1615 receiving, from the radio access network node, an on demand digital signature according to the on demand digital signature capability; at block 1620 generating a local digital signature based on at least one of the first information block or the second information block; at block 1625 analyzing, by the user equipment, the on demand digital signature with respect to the local digital signature to result in an authentication result; and at block 1630 based on the authentication result, performing, by the user equipment, a connection establishment action.

Figure 17:
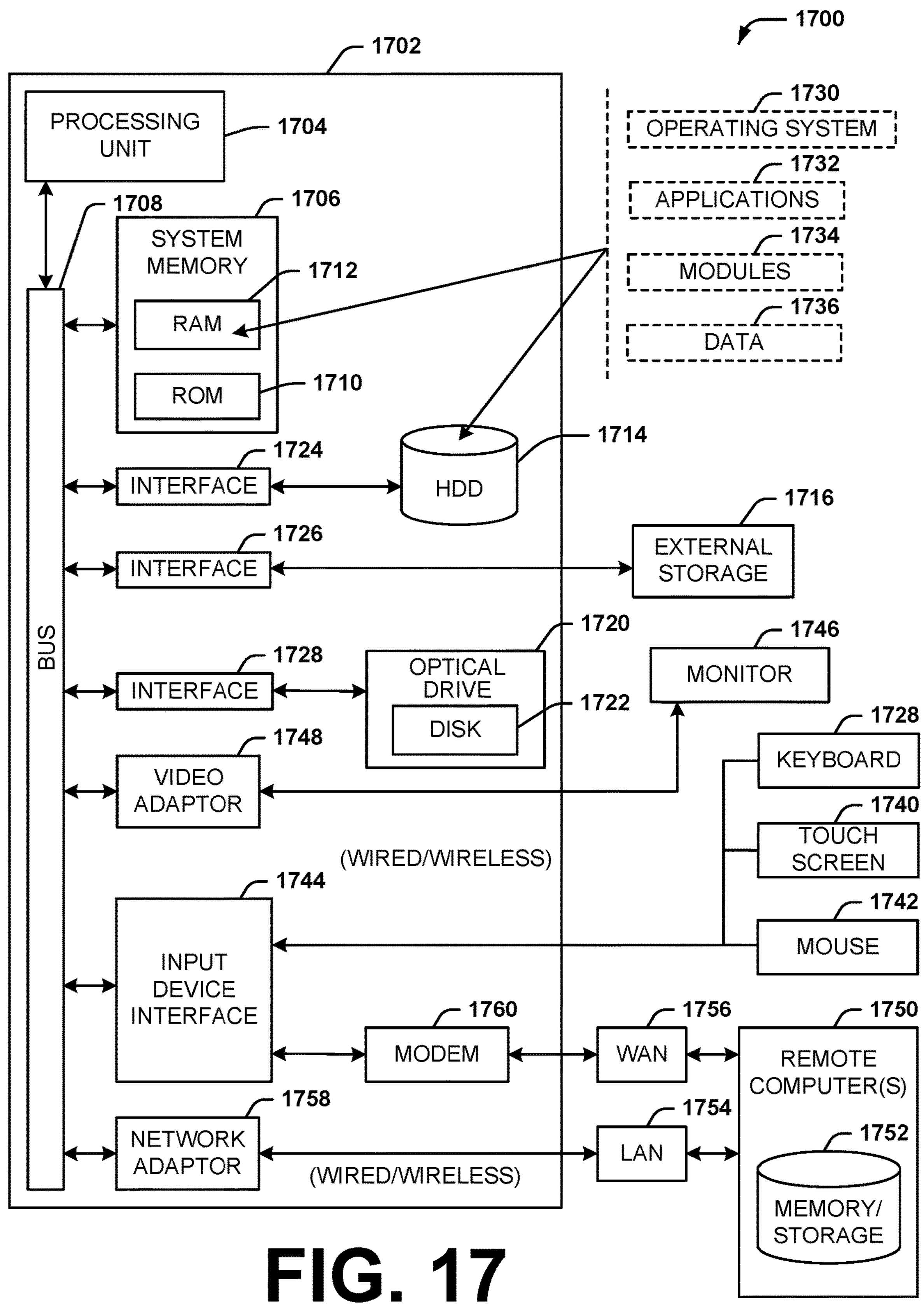
FIG. 17 illustrates an example computer environment.

In order to provide additional context for various embodiments described herein, FIG. 17 and the following discussion are intended to provide a brief, general description of a suitable computing environment 1700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors and may include a cache memory. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

Computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid-state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can comprise a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
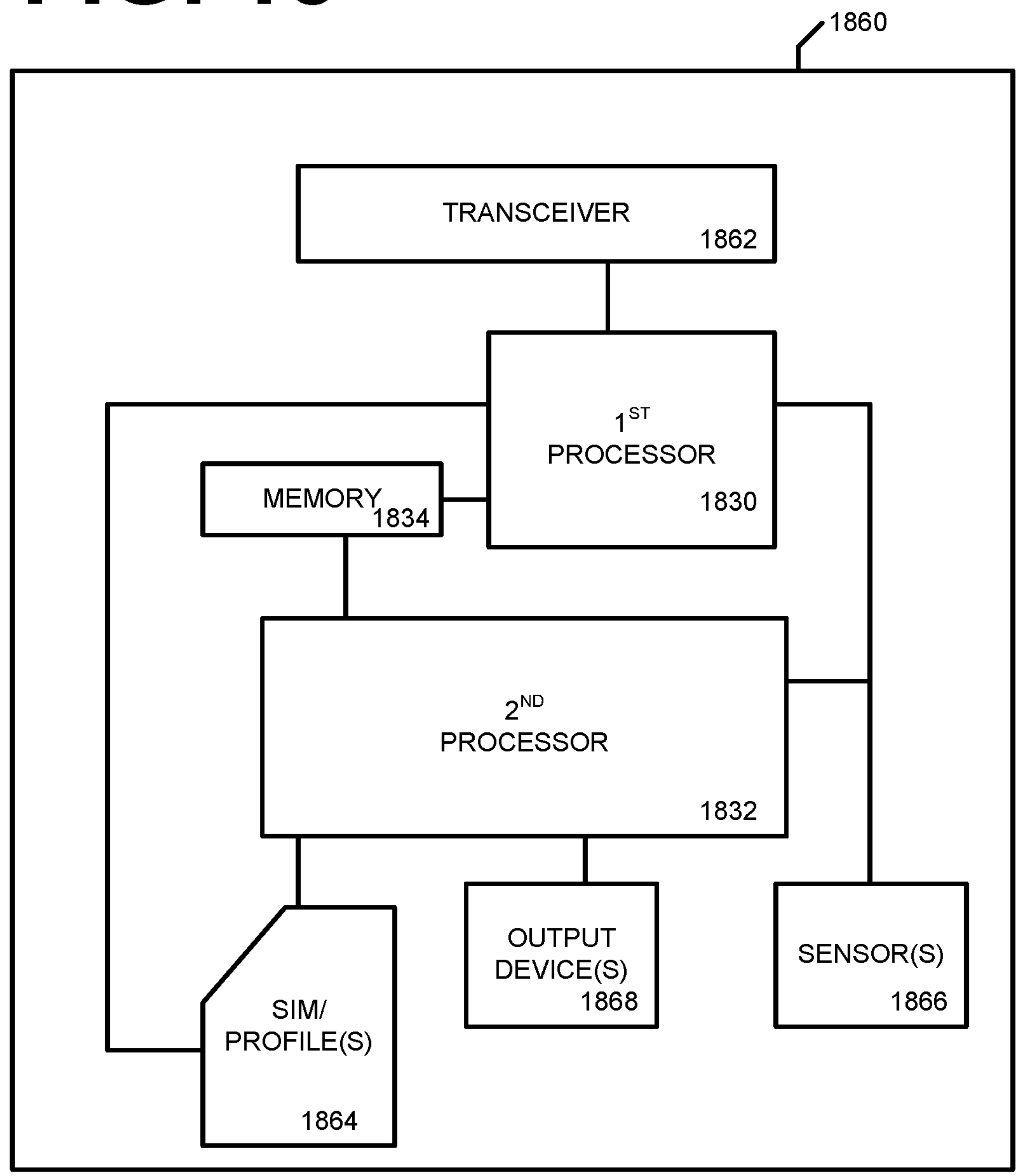
FIG. 18 illustrates a block diagram of an example wireless user equipment.

Turning to FIG. 18, the figure illustrates a block diagram of an example UE 1860. UE 1860 may comprise a smart phone, a wireless tablet, a laptop computer with wireless capability, a wearable device, a machine device that may facilitate vehicle telematics, a tracking device, remote sensing devices, and the like. UE 1860 comprises a first processor 1830, a second processor 1832, and a shared memory 1834. UE 1860 includes radio front end circuitry 1862, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1862 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 18, UE 1860 may also include a SIM 1864, or a SIM profile, which may comprise information stored in a memory (memory 1834 or a separate memory portion), for facilitating wireless communication with RAN 105 or core network 130 shown in FIG. 1. FIG. 18 shows SIM 1864 as a single component in the shape of a conventional SIM card, but it will be appreciated that SIM 1864 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1864 and another device, which may be a component of RAN 105 or core network 130 shown in FIG. 1). A SIM profile 1864 may also comprise identifying information that is unique to the SIM, or SIM profile, such as, for example, an International Mobile Subscriber Identity ("IMSI") or information that may make up an IMSI.

SIM 1864 is shown coupled to both the first processor portion 1830 and the second processor portion 1832. Such an implementation may provide an advantage that first processor portion 1830 may not need to request or receive information or data from SIM 1864 that second processor 1832 may request, thus eliminating the use of the first processor acting as a 'go-between' when the second processor uses information from the SIM in performing its functions and in executing applications. First processor 1830, which may be a modem processor or a baseband processor, is shown smaller than processor 1832, which may be a more sophisticated application processor, to visually indicate the relative levels of sophistication (i.e., processing capability and performance) and corresponding relative levels of operating power consumption levels between the two processor portions. Keeping the second processor portion 1832 asleep/inactive/in a low power state when UE 1860 does not need it for executing applications and processing data related to an application provides an advantage of reducing power consumption when the UE only needs to use the first processor portion 1830 while in listening mode for monitoring routine configured bearer management and mobility management/maintenance procedures, or for monitoring search spaces that the UE has been configured to monitor while the second processor portion remains inactive/asleep.

UE 1860 may also include sensors 1866, such as, for example, temperature sensors, accelerometers, gyroscopes, barometers, moisture sensors, and the like that may provide signals to the first processor 1830 or second processor 1832. Output devices 1868 may comprise, for example, one or more visual displays (e.g., computer monitors, VR appliances, and the like), acoustic transducers, such as speakers or microphones, vibration components, and the like. Output devices 1868 may comprise software that interfaces with output devices, for example, visual displays, speakers, microphones, touch sensation devices, smell or taste devices, and the like, which are external to UE 1860.

The following glossary of terms given in Table 7 may apply to one or more descriptions of embodiments disclosed herein.

TABLE 7

| Term | Definition |
|---|---|
| UE | User equipment |
| WTRU | Wireless transmit receive unit |
| RAN | Radio access network |
| Qos | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a radio access network node comprising at least one processor, transmitting, to a user equipment, a connection establishment message comprising an on demand digital signature capability indication;

responsive to the transmitting of the connection establishment message, facilitating, by the radio access network node, receiving, from the user equipment, an on demand digital signature request comprising on demand digital signature information;

generating, by the radio access network node, an on demand digital signature based on the on demand digital signature information;

facilitating, by the radio access network node, transmitting, to the user equipment, the on demand digital signature; and responsive to the transmitting of the on demand digital signature, facilitating, by the radio access network node, establishing, with the user equipment, a communication session, wherein the on demand digital signature information comprises a message block indication that indicates that the on demand digital signature is to be based on at least one of a master information block or a system information block, and wherein the on demand digital signature is based on at least one of the master information block or the system information block.

2. The method of claim 1, wherein the on demand digital signature information comprises a random number based on a unique identifier corresponding to the user equipment.

3. The method of claim 1, wherein the connection establishment message is a radio resource control message.

4. The method of claim 1, wherein the connection establishment message is a master information block message.

5. The method of claim 4, wherein the on demand digital signature information comprises an indication indicative that the on demand digital signature is to be based on at least the master information block message.

6. The method of claim 1, wherein the connection establishment message is a system information block message.

7. The method of claim 6, wherein the on demand digital signature information comprises an indication indicative that the on demand digital signature is to be based on at least the system information block message.

8. The method of claim 6, wherein the system information block message is a system information block 1 message.

9. The method of claim 1, further comprising:

generating, by the radio access network node, a connection establishment message digest based on the connection establishment message; and applying, by the radio access network node, a unique cryptographic key corresponding to the radio access network node to the connection establishment message digest to result in the on demand digital signature.

10. The method of claim 1, wherein the transmitting of the on demand digital signature comprises transmitting the on demand digital signature to the user equipment in a system information block message.

11. The method of claim 1, wherein the system information block is a system information block 22.

12. A radio access network node, comprising:

at least one processor configured to:

broadcast a minimum requirement message comprising an on demand digital signature capability indication;

responsive to the minimum requirement message being broadcast, receive, from the user equipment, an on demand digital signature request comprising on demand digital signature information that comprises a message block indication indicative of a message block to be used to generate the on demand digital signature, wherein the message block indication that indicates that the on demand digital signature is to be based on at least one of the master information block or the system information block;

generate an on demand digital signature based on the at least one of the master information block or the system information block;

transmit, to a user equipment, the on demand digital signature;

responsive to the on demand digital signature being transmitted to the user equipment, receive, from the user equipment, a connection establishment request message; and responsive to the connection establishment request message being received, establish, with the user equipment, a communication session.

13. The radio access network node of claim 12, wherein the minimum requirement message comprises at least one of: a master information block or a system information block.

14. The radio access network node of claim 12, wherein the system information block is a first system information block, and wherein the on demand digital signature information comprises a message block indication that indicates that the on demand digital signature is to be based on one or more of the master information block, the first system information block, or a second information block different from the first system information block.

15. The radio access network node of claim 14, wherein the message block indication comprises a bitmap that excludes one or more bits being mapped to the master information block and the first system information block.

16. The radio access network node of claim 12, wherein the system information block is a system information block other than system information block 1 through system information block 21.

17. A non-transitory machine-readable medium, comprising executable instructions that, when executed by at least one processor of a radio access network node, facilitate performance of operations, comprising:

broadcasting a first radio resource control message comprising an on demand digital signature capability indication indicative of an on demand digital signature capability;

responsive to the broadcasting of the first radio resource control message, receiving, from a user equipment, an on demand digital signature request message;

responsive to the on demand digital signature request message, generating an on demand digital signature according to the on demand digital signature capability;

transmitting, to the user equipment, the on demand digital signature;

receiving, from the user equipment, a second radio resource control message comprising a connection request message; and responsive to second radio resource control message, establishing, with the user equipment, a communication session, wherein the on demand digital signature request message comprises a bit map indicative of on demand digital signature information to be used to generate the on demand digital signature.

18. The non-transitory machine-readable medium of claim 17, wherein the first radio resource control message comprises at least one of: a master information block or a system information block, and wherein the bit map is indicative of at least one of the master information block or the system information block.

19. The non-transitory machine-readable medium of claim 18, wherein the system information block is a system information block higher than a system information block 21.

20. The non-transitory machine-readable medium of claim 17, wherein the first radio resource control message comprises a system information block 1.

* * * * *